United States Patent [19]

Wakamiya et al.

[11] Patent Number: 4,768,868
[45] Date of Patent: Sep. 6, 1988

[54] REAR CONVERSION LENS

[75] Inventors: Koichi Wakamiya, Tokyo; Daijiro Fujie, Sagamihara, both of Japan

[73] Assignee: Nippon Kogaku K. K., Tokyo, Japan

[21] Appl. No.: 931,938

[22] Filed: Nov. 18, 1986

Related U.S. Application Data

[63] Continuation-in-part of Ser. No. 705,539, Feb. 26, 1985, abandoned.

[30] Foreign Application Priority Data

Feb. 28, 1984 [JP] Japan .................................. 59-36791
Dec. 27, 1985 [JP] Japan .................................. 60-294770

[51] Int. Cl.⁴ .......................... G02B 15/02; G02B 9/64
[52] U.S. Cl. ..................................... 350/463; 350/422
[58] Field of Search ............................... 350/422, 463

[56] References Cited

U.S. PATENT DOCUMENTS 4,591,234  5/1986  Hamanishi ........................... 350/422

FOREIGN PATENT DOCUMENTS 0094318  7/1981  Japan .
0095210  8/1981  Japan .
0046224  3/1982  Japan .
0133424  8/1982  Japan ................................... 350/422
0032681  7/1983  Japan .

Primary Examiner—John K. Corbin
Assistant Examiner—Rebecca D. Gass
Attorney, Agent, or Firm—Shapiro and Shapiro

[57] ABSTRACT

A rear conversion lens to be mounted in between an objective lens and a determined image plane to produce a composite focal length longer than the focal length of the objective lens itself comprises, in the order from the object side a first lens component, a second lens component and a third lens component. The first lens component has a positive focal length and the image-side lens surface being convex toward the image side. The second lens component has a negative focal length and the object-side lens surface being convex toward the image side. The third lens component has a negative focal length and is in the shape of a meniscus convex toward the image side.

31 Claims, 20 Drawing Sheets

REAR CONVERSION LENS

This is a continuation-in-part application of Ser. No. 705,539 filed Feb. 26, 1985, now abandoned.

BACKGROUND OF THE INVENTION

1. Field of the Invention

The present invention relates to an optical system called a rear conversion lens which is mounted in the optical path between a master lens and the image plane to change the focal length of the total system. More particularly, the present invention relates to a rear conversion lens suitable for those compact cameras which have a view-through finder.

2. Description of the Prior Art

As the optical system used to increase or decrease the focal length of a photographing lens there have been known and used two different types of conversion lenses, i.e., front conversion lens and rear conversion lens. When used, the front conversion lens is mounted on the object side of the photographing lens, whereas the rear conversion lens is mounted on the image side of the photographing lens. The front conversion lens has some disadvantages. It is large in lens size. Especially, the front lens component of the front conversion lens needs a large diameter, and reduction of the size is practically unrealizable. In addition, as it is attached in front of the master lens, the front conversion lens projects from the camera body. It is difficult for a camera body to have such a front conversion lens within it as a built-in lens. Compared with the front conversion lens, the rear conversion lens has the advantages that it is possible to further reduce the size and that it is easy to contain the conversion lens within a camera body because the lens is mounted at a position near the image plane.

Conventional rear conversion lenses hitherto well-known in the art are, first of all, those which have been adapted for the objective lenses for singlelens reflex cameras. For example, they are disclosed in Japanese Patent Publication Nos. 12,421/1976; 34/813/1983; 13,015/1976 and Japanese Laid Open Patent Application No. 123,515/1983.

For the master lens in a single lens reflex camera, a longer back focus than generally determined is required and, therefore, the position of the exit pupil is far from the image plane as compared with the lens for a compact camera. FIG. 1 illustrates this. In FIG. 1, P is an exit pupil, Q is the center of the pupil and Y is the maximum image height. $\theta$ is the angle which the ray running toward the maximum image height (Y) forms with the optical axis. This angle $\theta$ is referred to as the exit angle. The lenses for a compact camera generally have a large exit angle but the lenses for a single lens reflex camera have a small exit angle. Therefore, when a rear conversion lens suitable for the master lens for a single lens reflex camera is mounted to a compact camera lens, it is no longer possible to obtain sufficiently well-corrected aberrations because of the difference in exit angle between the two camera lenses. The prior art rear conversion lens disclosed in the above-referred Japanese Patent Publication No. 13,015/1976 is relatively simple in structure. However, since the distance between two lens groups is large, the conversion lens is of large size which is unsuitable to be contained in the body of a camera. The rear conversion lenses disclosed in Japanese Patent Publication Nos. 12,421/1976 and 34,813/1983 are also unsuitable to be build in a camera body. They are composed of five or six lenses and, therefore, they are complex in construction. In addition, the total length thereof is too large to be a built-in lens. The conversion lens proposed by Japanese Laid Open Patent Application No. 123,515/1983 is a very thin tele-conversion lens. It is composed of only four of five lenses and of simple construction. However, its magnification is low which is ×1.4324 at maximum. There are also known many other tele-conversion lenses adapted for telephoto lenses. However, they are generally unsuitable for compact cameras because the exit pupil is distant from the image plane.

Examples of the tele-conversion lenses designed for compact camera are disclosed in Japanese Patent Publication No. 32,681/1983 and Japanese Laid Open Patent Application Nos. 94,318/1981, 95,210/1981 and 46,224/1982. These tele-conversion lenses have the following drawbacks:

The conversion lens disclosed in the first mentioned patent publication No. 32,681/1983 is composed of six lenses which is too many to obtain a compact construction. So, the drawback of the known conversion lens is its complex structure.

The conversion lens disclosed in the Japanese Laid Open Patent Application No. 94,318/1981 is composed of two components, a convex lens and a concave lens. The conversion lenses proposed by the Japanese Laid Open Patent Application Nos. 95,210/1981 and 46,224/1982 are of three component type comprising convex, concave and convex lenses. These conversion lenses are all compact but involve a problem of the generation of coma. In these prior art conversion lenses, aberrations are corrected in such manner as to correct mainly the remaining aberrations of the master lens. Therefore, when the conversion lens and the master lens are coupled together, sufficiently good optical performance is not obtained. In the specifications of these prior applications there have been shown some embodiments of the conversion lens having 1.514 magnification. However, it has been found that at higher magnification, the problem of coma in the prior art conversion lenses is aggravated by the effect of higher order aberrations.

SUMMARY OF THE INVENTION

Accordingly, it is a general object of the present invention to overcome the afore-mentioned drawbacks of the prior art rear conversion lenses.

More specifically it is an object of the invention to provide a rear conversion lens which generates less aberration and has good performance at high magnification of from 1.5 to 2.0.

It is another object of the invention to provide a rear conversion lens which can be mounted in a camera body while assuring high image quality.

It is a further object of the invention to provide a rear conversion lens which can easily be retracted from the optical path into a receiving chamber without requiring a large space for the receiving chamber.

Other objects, features and advantages of the invention will appear more fully from reading the following description.

Referring to FIG. 2, the present invention relates to a rear conversion lens (RCL) which is mounted in between an object lens or master lens (ML) and a predetermined image plane (I). The function of the rear conversion lens is to cooperate with the objective lens (ML) to produce a composite focal length ft longer than the objective lens's own focal length f. In order to attain the above objects, the rear conversion lens according to the present invention is composed of three lens components, first lens component (L1), second lens component (L2) and third lens component (L3) arranged in the named order from the object side. The first lens component (L1) has a positive focal length with the lens surface on the image side being convex toward the image side. The second lens component (L2) has a negative focal length with the lens surface on the object side being convex toward the image side. The curvature of the lens surface on the object side is stronger than that of the lens surface on the image side. The third lens component (L3) has a negative focal length and is in the shape of a meniscus convex toward the image side. According to a further feature of the present invention, the rear conversion lens satisfies the following conditions:

$$0.2 < r2/d0 < 0.8 \quad (1)$$

$$-0.35 < r3/r4 < 0.94 \quad (2)$$

$$|r5| < |r6| \quad (3)$$

$$0.1 < f2/f3 < 3.0 \quad (4)$$

wherein, r1 and r2 are curvature radii of the lens surfaces on the object side and on the image side of the first lens component (L1);

r3 and r4 are curvature radii of the lens surfaces on the object side and on the image side of the second lens component (L2);

r5 and r6 are curvature radii of the lens surfaces on the object side and on the image side of the third lens component (L3);

—d0 is the distance between the rear focal point and the apex of the lens surface on the object side of the first lens component, that is, the distance of the object point to the rear conversion lens;

f2 is the focal length of the second lens component; and f3 is the focal length of the third lens component.

The features of the present invention will hereinafter be described.

For the rear conversion lens which is to be mounted in between a master lens and a determined image plane to extend the focal length of the master lens, it is necessary to have a negative focal length. So long as the aberrations of the master lens have been corrected sufficiently well, the use of a conversion lens having a negative power generally produces spherical aberration in the positive direction. Further, it is apt to generate a Petzval sum in the negative direction, meridional curvature of field in the positive direction and distortion in the positive direction. In addition, coma is generated because the rays near the edge of the negative power lens are subjected to a strong diverging action. In order to compensate these aberrations it is required for the conversion lens to contain therein at least one positive lens. One can correct the spherical aberration, curvature of field, distortion and coma by use of the strong converging action of the positive lens. However, another problem arises by incorporating such a strong convex lens into the tele-converter whose power must be negative in total. In this case, in order to keep the total power constant, the convex lens component of the tele-converter needs a stronger power, which causes the problem of the generation of higher order aberrations.

The master lens for a compact camera has a wider exit angle than that for a single lens camera. The exit angle of the former is in the range of 25° to 40°.

In contrast, the exit angle of the latter is, for example, only 20° (calculated from the embodiment in the specification of Japanese Laid Open Patent Application No. 123,515/1983). Therefore, in the case of a compact camera, the curvature of field and coma are apt to vary according to the image height because of the wide exit angle.

According to the present invention, the above problem of aberration is solved or minimized by employing the lens construction of positive-negative-negative type instead of the conventional positive-negative type of positive-negative-positive type. In the rear conversion lens according to the invention, the first lens component having a positive refractive power has the function to correct spherical aberration, meridional curvature of field and coma which are inevitably produced because the rear conversion lens is a negative lens on the whole. A further function of the first lens component having a positive power is to reduce the incidence angle of the off-axial rays to the next negative lens. Both of the second and third lens components are negative lenses. The strong diverging action of the lens is suitably divided between these two negative components. This has the effect of reducing the generation of higher order aberrations by the diverging lens. Also, coma is better corrected. This arrangement is effective to correct coma well even at high magnification.

The above condition (1) defines the range of value r2 relative to d0.

In general, the value of $|r1/r2|$ increases with increasing the exit angle of the master lens. This is because, in the case of a master lens having a large exit angle, the optical properties of the image plane, such as astigmatism and coma, vary depending on the image height, and the value of $|r1/r2|$ must be increased in order to prevent the variation. For this reason, according to a feature of the present invention, the image-side lens surface of the first lens component (L1) takes a larger share in the action tending to direct the spherical aberration in a negative direction. If the value is over the upper limit of the condition (1), the spherical aberration will be overcorrected. If the value is under the lower limit of the condition (1), the action tending to direct the spherical aberration in the negative direction will be too strong, thereby increasing the effect of aberrations of higher order. Thus, the spherical aberration is curved so that good correction is not attainable. In the conditions (19, it is preferable that $0.3 < r2/d0 < 0.65$. In preferred embodiments of the present invention, $|r1/r2| > 1.5$.

The second condition (2) limits the shape of the second lens component (2). As previously described, the object-side surface of the second lens component has a negative value, that is to say, convex toward the image side. The condition (2) means that the radius of curvature of the object-side surface r3 should be larger than that of the image-side surface r4. If the upper limit of the second condition (2) is exceeded, then the diverging refractive power on the image-side surface will be rendered weak. To compensate this, the third lens component (3) is required to increase the diverging force accordingly, which will result in, growing worse. If the lower limit of the condition is exceeded, then the diverging refractive power on the image-side surface will be rendered too strong. In this case also, coma grows worse so that the aberration can not be corrected well. The upper limit of the second condition concerning r3/r4 can be set to be 0.39.

The third condition (3) defines the relation between the object-side surface and the image-side surface of the third lens component (L3). When this condition is satisfied, the third lens component is able to gradually and gently diverge rays on both of the two surfaces. If the condition (3) is not satisfied, the diverging action on one of the two surfaces becomes weak and, therefore, the diverging action on the other surface becomes excessive, which may produce higher order aberrations. In this case, aberrations, especially coma, can not be corrected well.

The fourth condition (4) shows the shares which the second and third lens components (L2) and (L3) should bear in power respectively. If this condition (4) is not satisfied, one of the two lens components is too strong in power. There will be generated various aberrations characteristic of a negative lens, such as distortion and coma. In order to correct a negative Petzval sum as generated by a rear conversion lens, it is desirable that the positive lens be close to the image plane. In the positive-negative-negative arrangement of lens components according to the present invention, therefore, it is desirable that the positive lens component and the negative lens component be as close to each other as possible. If the upper limit of the condition (4) is exceeded, then the power of the third lens component (L3) will become stronger relative to the second lens component (L2). Necessarily, it has the same effect as that caused by extending the distance between the positive and negative lens components. In this case, it is impossible to keep the Petzval sum at the desired level. If the lower limit of the condition (4) is exceeded, the diverging action of the second lens component will be rendered too strong although it is advantageous for the correction of the Petzval sum. Because of the too strong diverging action of the second lens component, positive distortion and coma owing to higher order aberrations becomes undesirably large. It is no longer possible to correct the aberrations well.

In further preferred embodiments of the invention in which the size of the rear conversion lens is so reduced that it can be incorporated into a camera body, the lens satisfies the following conditions (5) and (6) in addition to the above basic conditions (1) to (4):

$$0.25 < \frac{-r5}{Y} < 1.50 \quad (5)$$

$$0.15 < \frac{\Sigma d}{Y} < 1.2 \quad (6)$$

wherein,

Y is the maximum image height in the image plane, that is, ½ of the image circle; and $\Sigma d$ is the total length of the rear conversion lens, that is, the distance from the apex of the front-most lens surface (r1) to the apex of the rear-most lens surface (r6).

The condition (5) defines the range of value r5, i.e., the curvature radius of the object-side surface of the third lens (L3) relative to the maximum image height Y of the optical system.

If the lower limit of the condition (5) is exceeded, the value of r5 becomes relatively so small that the marginal portion of the third lens may contact with the second lens component L2. So, the air distance between the second and third lens components must be increased, which in turn requires undesirable increase of the total length of the lens. If the upper limit of the condition (5) is exceeded, the diverging action of the object-side surface of the third lens component L3 is too weak although the total length of the lens can be reduced. The weakened diverging action must be compensated by other lens surfaces. Because of this coma is generated that is difficult to correct well.

The condition (6) limits the value of the total length $\Sigma d$ to the maximum image height Y. If the value is under the lower limit of the condition (6), the lens thickness on axis is so thin that the machining of the lens is very difficult to carry out. If the value is over the upper limit of the condition, the total length of the lens is almost equal to the thickness of the camera body. It is hardly possible to incorporate the lens into a compact camera.

In an embodiment of the present invention, each of the first, second and third lens components L1, L2 and L3 is composed of a single lens. For such an embodiment, the three single-lenses L1, L2 and L3 are preferably so selected as to satisfy the following conditions:

$$n_1 < 1.68 \quad (7)$$

$$1.69 < n_2 \quad (8)$$

$$n_1 < n_3 \quad (9)$$

wherein, $n_1$, $n_2$ and $n_3$ are refractive indexes of the lenses L1, L2 and L3, respectively.

The above conditions (7) to (9) are conditions necessary for correcting well the Petzval sum when the rear conversion lens is composed of the three components each comprising a single lens.

The Petzval sum is apt to generate in the negative direction in this type of rear conversion lens. In order to correct the negative Petzval sum effectively it is necessary for the positive lens to have a low refractive index and for the negative lenses to have high refractive indexes. If the above conditions (7), (8) and (9) are not satisfied, then the negative Petzval sum is too large to attain good correction of aberrations. In view of the correction of Petzval sum, it is desirable that the refractive index $n_1$ of the first lens component is as small as possible and the refractive index $n_2$ of the second one is as large as possible. But, the refractive indexes $n_1$ and $n_2$ are limited by available optical materials. This imposes the limitations of $1.46 < n_1$ and $n_2 < 1.97$.

Each of the lens components L1, L2 and L3 may be composed of a combination of a negative lens and a positive lens. The use of such a combination is advantageous for correcting the aberration. It is possible to attain better correction of the Petzval sum in the optical system by selecting a lower refractive index for the positive lens than that for the negative lens.

For those embodiments of the invention where at least a portion of the first, second and third lens components is composed of a cemented lens, it is desirably to satisfy the following conditions:

$$N1 < N2$$

$$N1 < N3$$

wherein, N1, N2 and N3 are average refractive indexes of the first, second and third lens components respectively.

In the present invention, it is desirable to satisfy the following condition:

$$0.2 < r2/r3 < 1.0 \tag{10}$$

wherein r2 and r3 are curvature radii of the lens surfaces on the image side of the first lens component and on the object side of the second lens component, respectively.

The condition (10) is a condition for correcting coma. In a rear conversion lens, lower light rays of a light beam which emerge toward a high image height pass through a position relatively near the optical axis of the lens and thereafter emerge, while lower light rays of a light beam which emerge toward a low image height pass through a position relatively far away from the optical axis of the lens and thereafter emerge, so that the light beam is given a strong divergent action. By this action, in the lower light rays of low image height, coma tends to worsen. However, if the curvature radius of the lens surface on the image side of the first lens component is relatively limited according to the condition (10), it is possible to well correct the coma. If the upper limit of the condition (10) is exceeded, a convergent action at the lens surface on the image side of the first lens component becomes weak and coma deteriorates. If the lower limit of the condition (10) is exceeded, a convergent action at the lens surface on the image side of the first lens component becomes too strong and coma deteriorates, and can not be well corrected.

PREFERRED EMBODIMENTS OF THE INVENTION

The following examples are shown to illustrate the present invention.

Example 1

Figure 1:
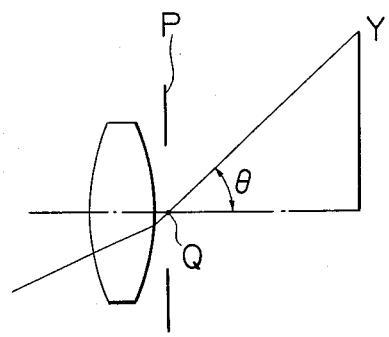
FIG. 1 is a view of a prior art objective lens (master lens) for illustrating the exit angle of the lens.
Figure 2:
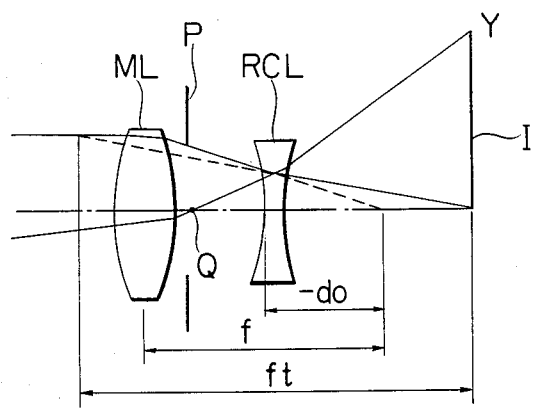
FIG. 2 is a schematic view of a master lens and a rear conversion lens coupled together.
Figure 3:
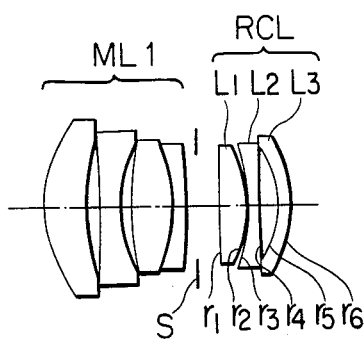
FIG. 3 shows the arrangement of lens components of the coupled Example 1 rear conversion lens and the first master lens.
Figure 12:
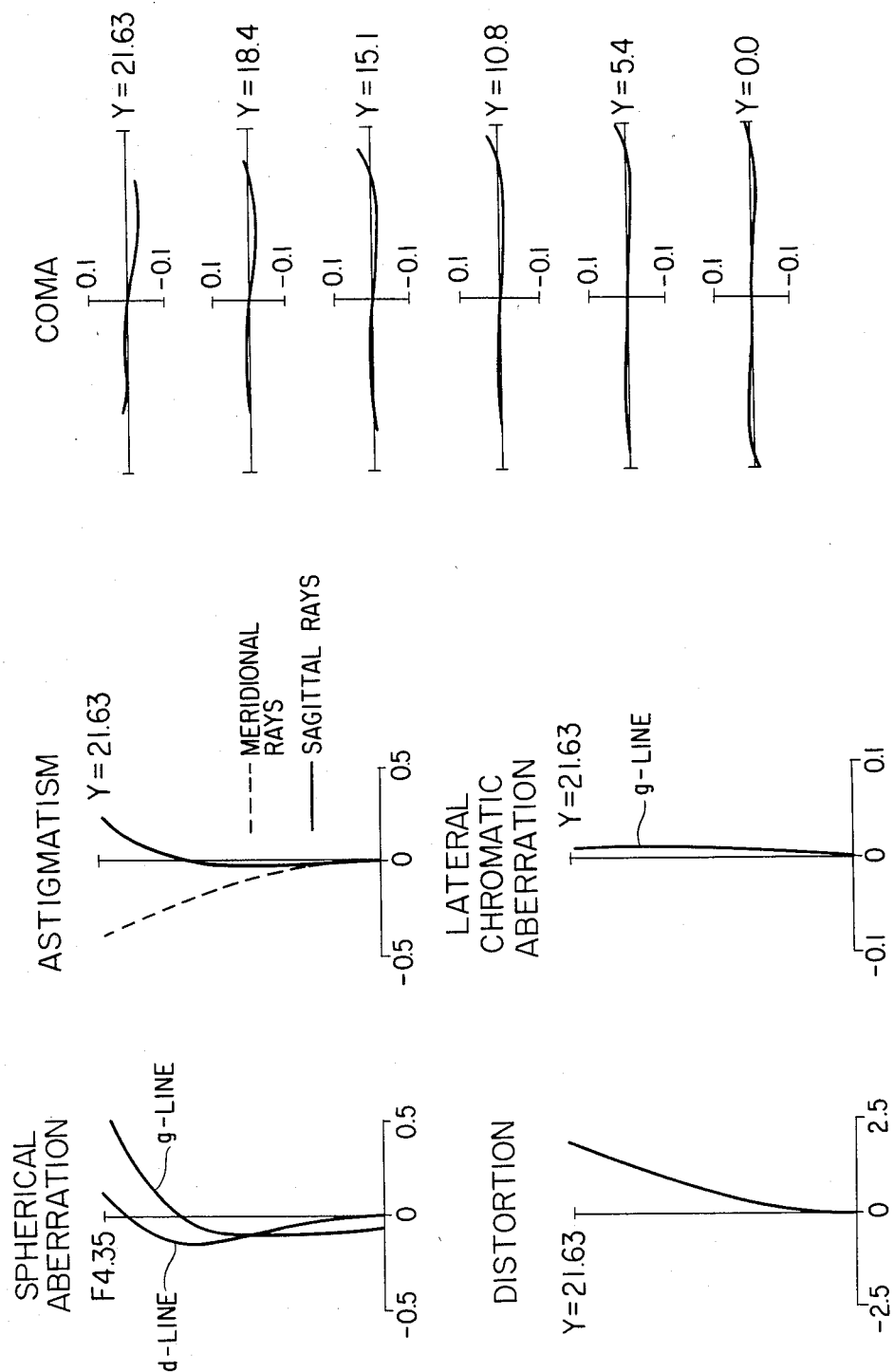
FIG. 12 shows aberrations of the combination of the first master lens and the rear conversion lens of Example 1.

Lens data of this example is shown in Table 2 (given later). This example is a basic example of the first group of embodiments in which three lens components (L1, L2, L3) of the rear conversion lens are each composed of a single lens. The magnification $\beta = 1.554$. By way of example, this rear conversion has been coupled with a master lens referred to as the first master lens (ML1) whose data are shown in Table 1. FIG. 3 shows the arrangement of the coupled first master lens and the first embodiment of rear conversion lens. FIG. 12 is a graph showing aberrations thereof.

In this embodiment, the coupling distance between the first master lens and the rear conversion lens was 1.958. The composite focal length $ft = 54.4$, F-number $= 4.35$ and the angle of field $2\omega = 42.6°$. The first master lens (ML1) used herein was a behind-stop, modified Tessar lens of $f = 35$, F-number $= 2.8$ and the angle of field $2\omega = 62.8°$. The exit pupil was just at the position of the aperture stop and the exit angle for the maximum image height $Y = 21.63$ was $39.7°$.

Figure 11:
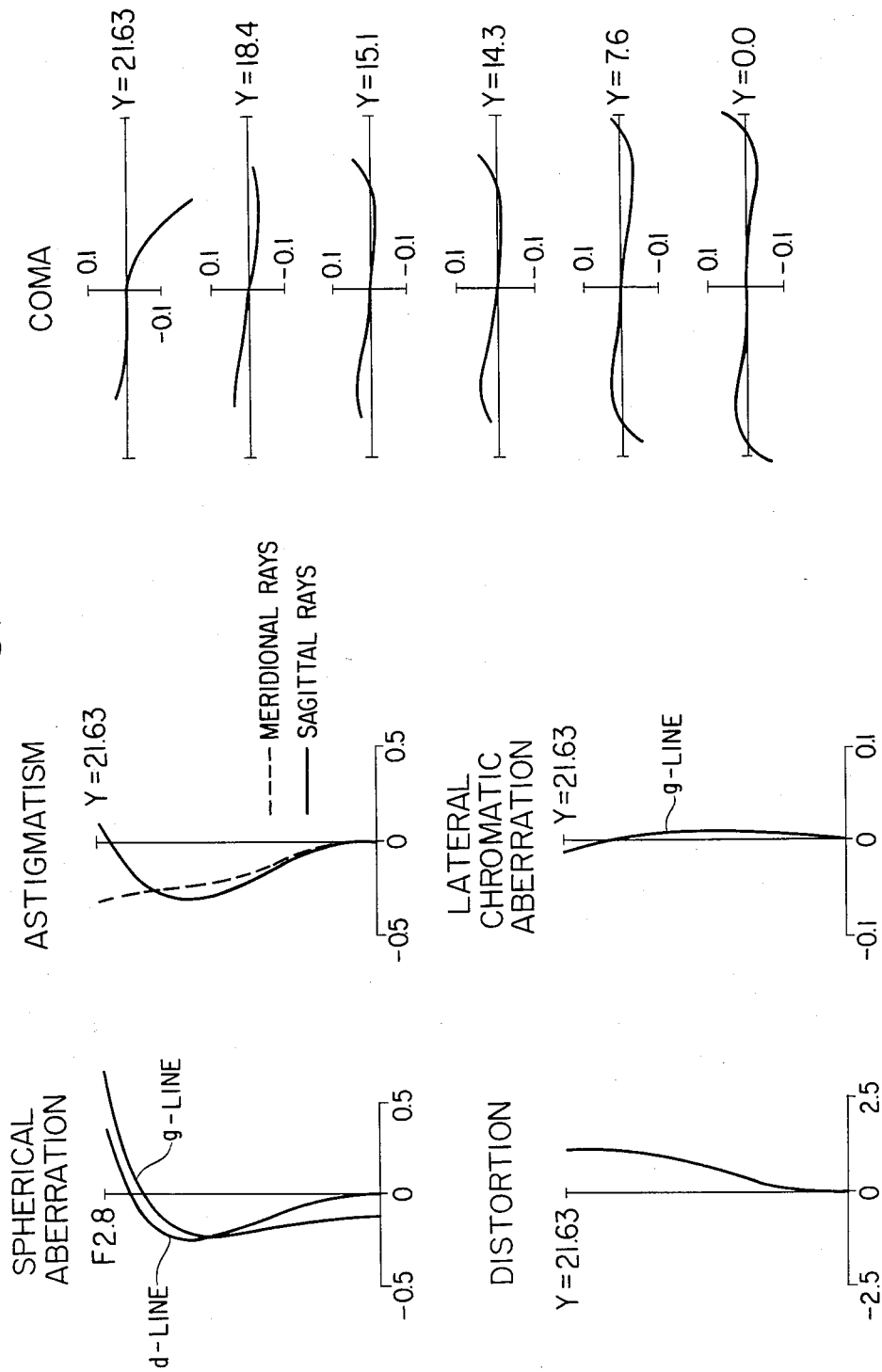
FIG. 11 shows aberrations of the first master lens.

FIG. 11 shows the aberrations of the first master lens (ML1).

Example 2

Figure 4:
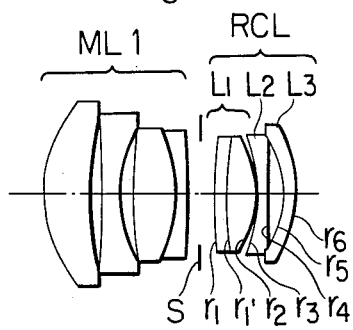
FIG. 4 shows the arrangement of lens components of the coupled Example 2 rear conversion lens and the first master lens.
Figure 13:
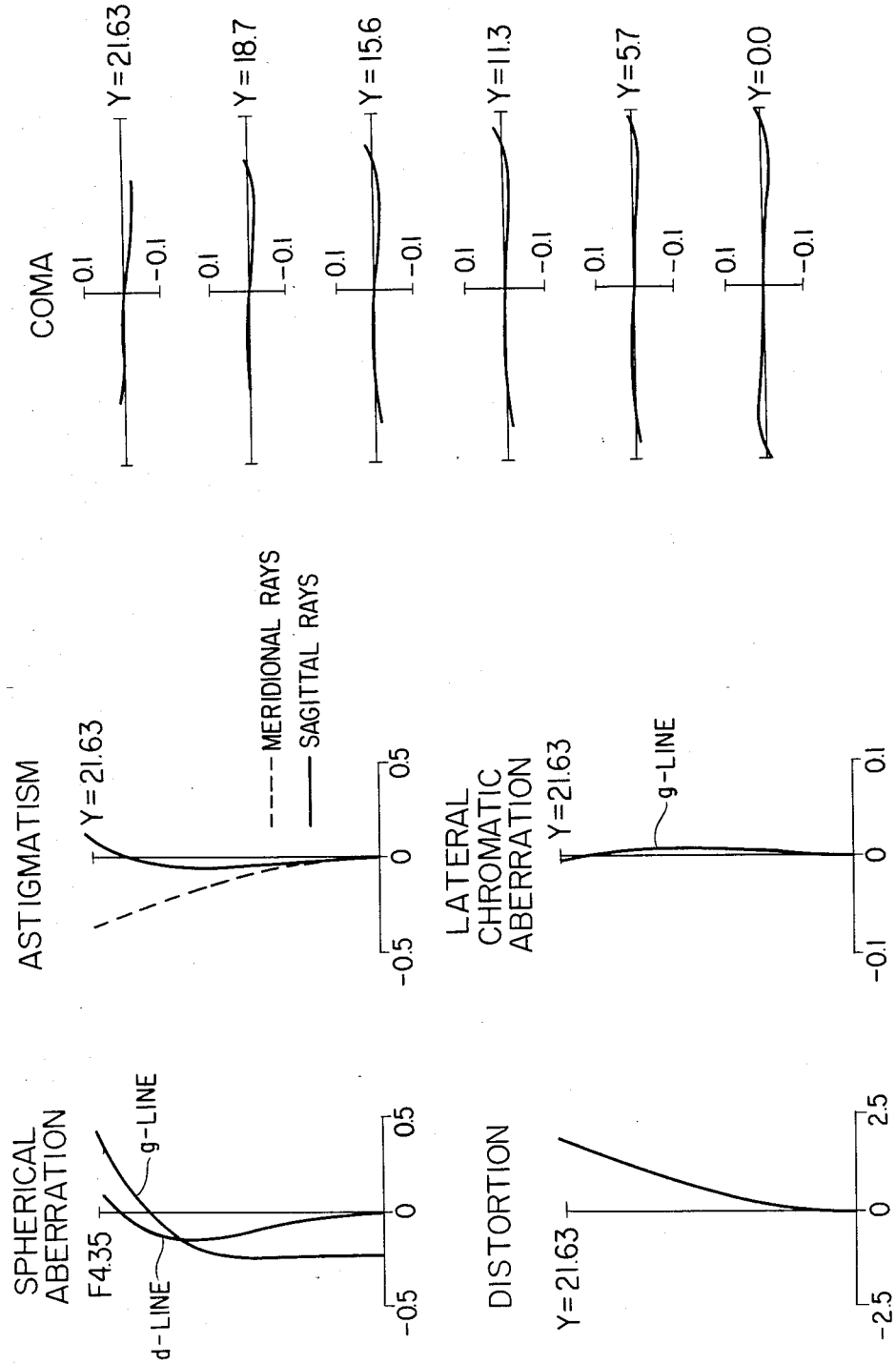
FIG. 13 shows aberrations of the combination of the first master lens and the rear conversion lens of Example 2.

This example is a rear conversion lens in which the first lens component L1 is a cemented lens consisting of a negative meniscus lens and a biconvex positive lens. Lens data of this rear conversion lens of Example 2 are shown in Table 3. The magnification $\beta = 1.554$. By way of example, this rear conversion lens was coupled with the above-mentioned first master lens (ML1) as shown in FIG. 4. Aberration curves obtained from this are shown in FIG. 13. In this embodiment, the coupling distance between the first lens and the rear conversion lens was 1.454. The composite focal length ft=54.4, F-number=4.35 and the angle of field $2\omega = 42.6°$.

Example 3

This example is a rear conversion lens of magnification $\beta = 1.554$ in which the second lens component L2 is a cemented lens composed of a biconcave negative lens and a biconvex positive lens. Lens data of this conversion lens are shown in Table 4.

Figure 5:
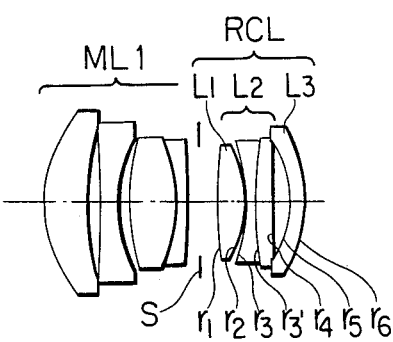
FIG. 5 shows the arrangement of lens components of the coupled Example 3 rear conversion lens and the first master lens.
Figure 14:
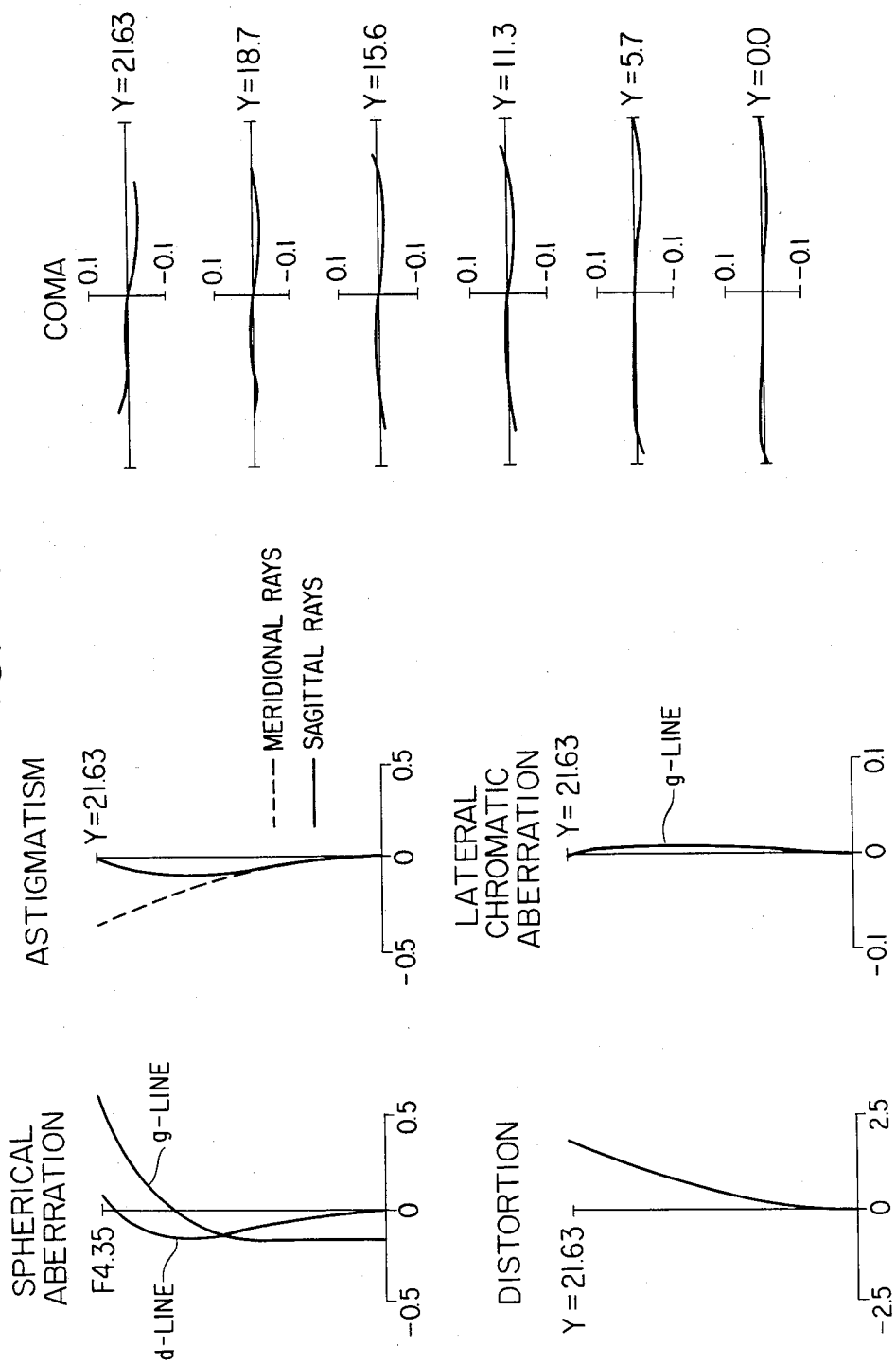
FIG. 14 shows aberrations of the combination of the first master lens and the rear conversion lens of Example 3.

By way of example, this rear conversion lens was coupled with the above-mentioned first master lens (ML1) as shown in FIG. 5. Aberration curves obtained therefrom are shown in FIG. 14. In this embodiment, the coupling distance between the first master lens and the rear conversion lens was 1.782. The composite focal length ft=54.4, F-number=4.35 and the angle of field $2\omega = 42.6°$.

Example 4

Figure 6:
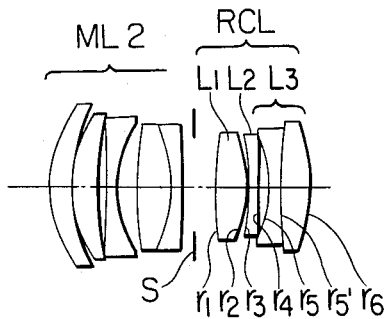
FIG. 6 shows the arrangement of the coupled Example 4 rear conversion lens and the second master lens.
Figure 16:
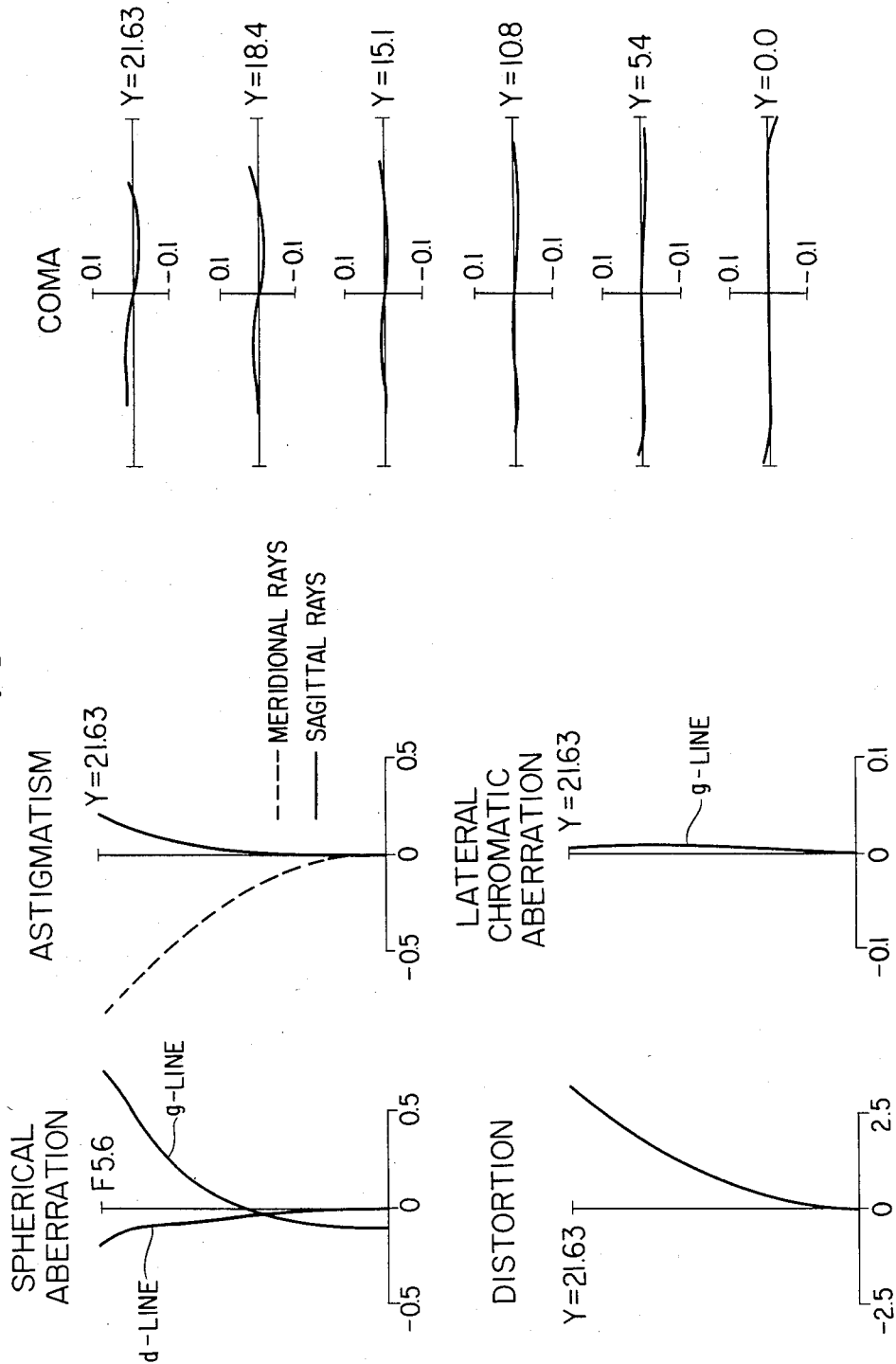
FIG. 16 shows aberrations of the combination of the second master lens and the rear conversion lens of Example 4.

This example is a rear conversion lens of magnification $\beta = 2.0$ in which the third lens component L3 is a cemented lens composed of a biconcave negative lens and a biconvex positive lens. Lens data of this rear conversion lens are shown in FIG. 6. By way of example, this rear conversion lens was coupled with a second master lens (ML2) whose data are shown in Table 5. FIG. 6 shows the arrangement of lens components of the coupled second master lens and the rear conversion lens of this example. Aberration curves obtained therefrom are shown in FIG. 16.

Figure 15:
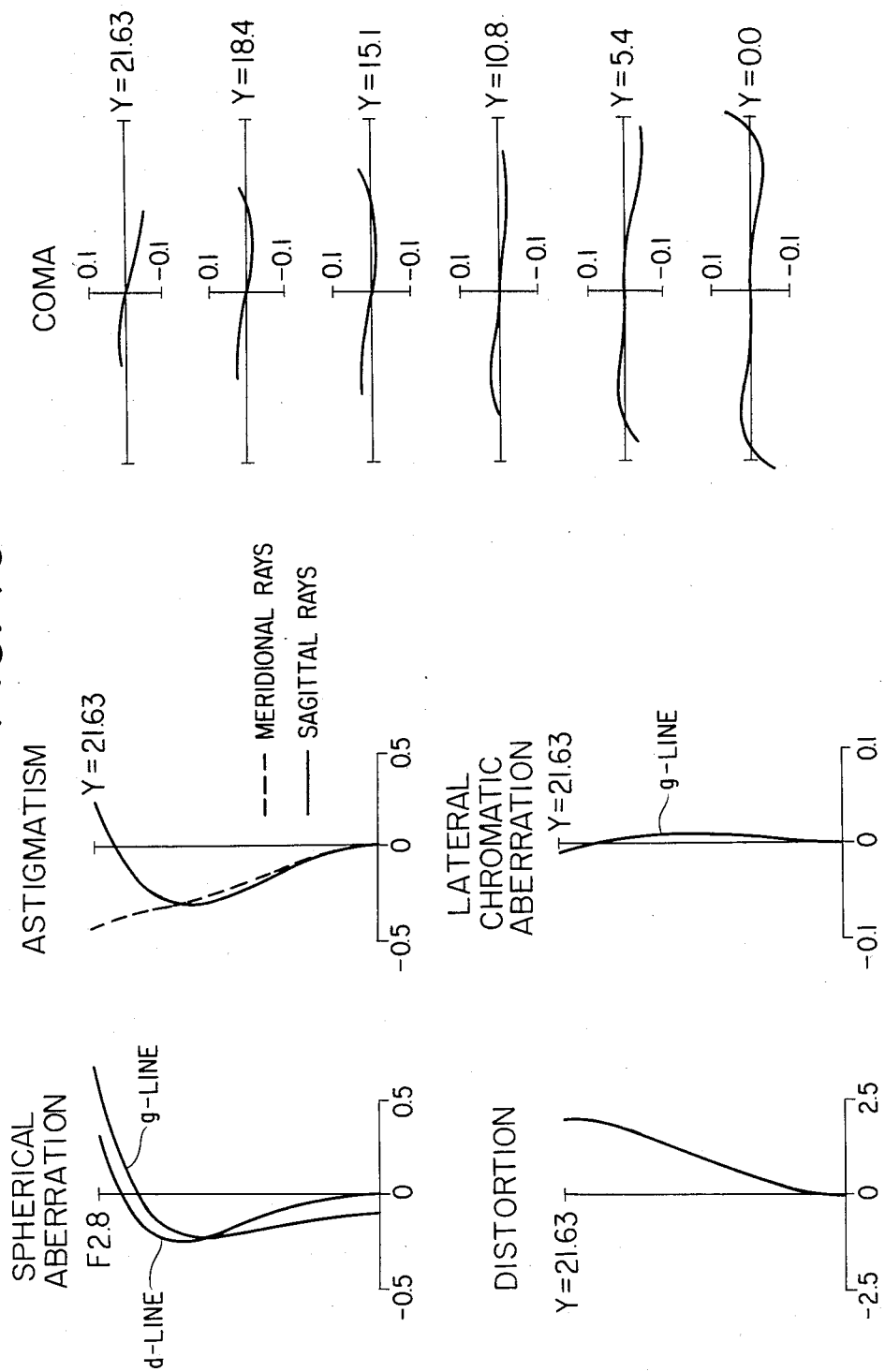
FIG. 15 shows aberrations of the second master lens.

In this embodiment, the coupling distance between the second master lens and the rear conversion lens was 2.01. The composite focal length ft=70, F-number=5.6 and the angle of view $2\omega = 33.4°$. The master lens ML2 is a behind-stop, modified Tessar lens having f=35, F-number=2.8 and the angle of view $2\omega = 62.4°$. The exit pupil is relatively close to the image plane for a (TESSAR) lens. The exit angle and the aperture stop (S) are coincident with each other in position and the exit angle for the maximum image height Y=21.63 is 40°. FIG. 15 shows aberrations of the second master lens ML2.

Example 5

This example is a rear conversion lens of magnification $\beta = 2.0$ in which the second lens component L2 is a cemented lens consisting of a biconcave negative lens and a biconvex positive lens. Lens data of this example are shown in Table 7.

Figure 7:
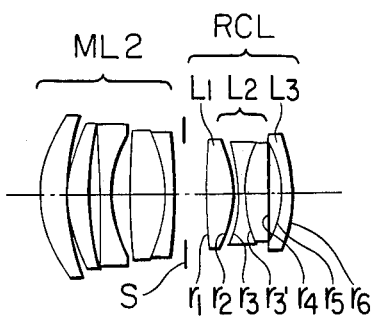
FIG. 7 shows the arrangement of lens components of the coupled Example 5 rear conversion lens and the second master lens.
Figure 17:
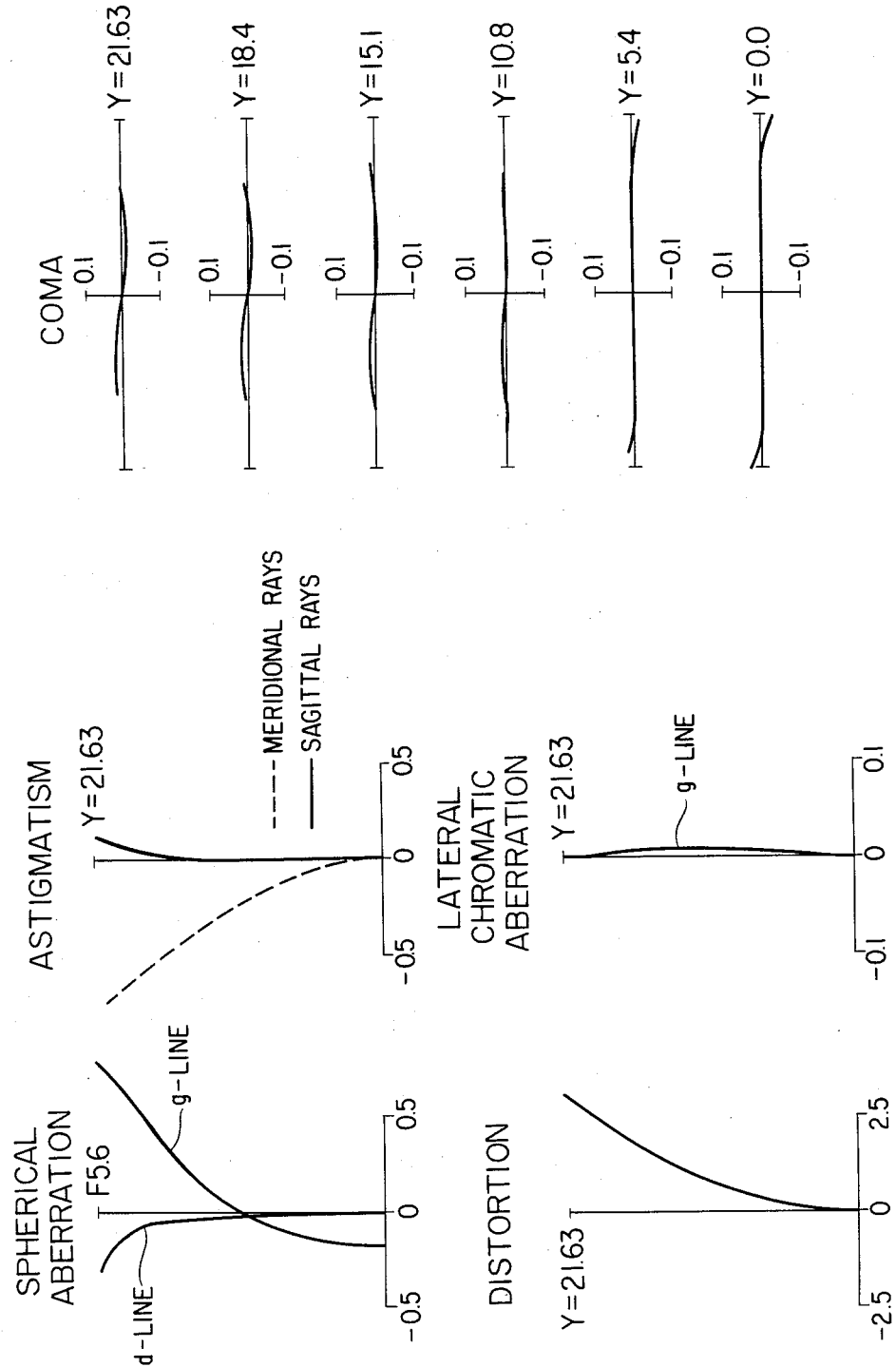
FIG. 17 shows aberrations of the combination of the second master lens and the rear conversion lens of Example 5.

By way of example, this rear conversion lens was coupled with the above-mentioned second master lens as shown in FIG. 7. Aberration curves obtained therefrom are shown in FIG. 17. In this embodiment, the coupling distance between the second master lens and the rear conversion lens was 1.747.

The composite focal length ft=70, F-number=5.6 and the angle of field $2\omega = 33.4°$.

As previously described, in a rear conversion lens generally, the correction of aberrations becomes more difficult with larger exit angle of the master lens and higher magnification. Against this common knowledge, in the above embodiments, Example 4 and Example 5, the aberrations have been corrected very well in spite of high magnification.

Example 6

This example is a rear conversion lens of magnification $\beta = 1.87$ in which the third lens component L3 is a cemented lens composed of a biconcave negative lens and a biconvex positive lens. Lens data of this example are shown in Table 9.

Figure 8:
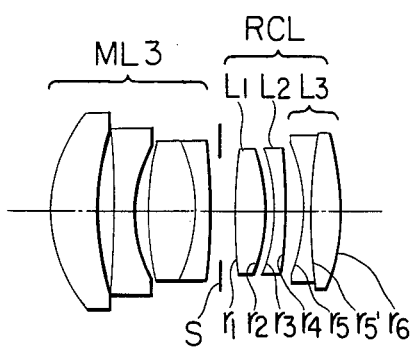
FIG. 8 shows the arrangement of lens components of the coupled Example 6 rear conversion lens and the third master lens.
Figure 18:
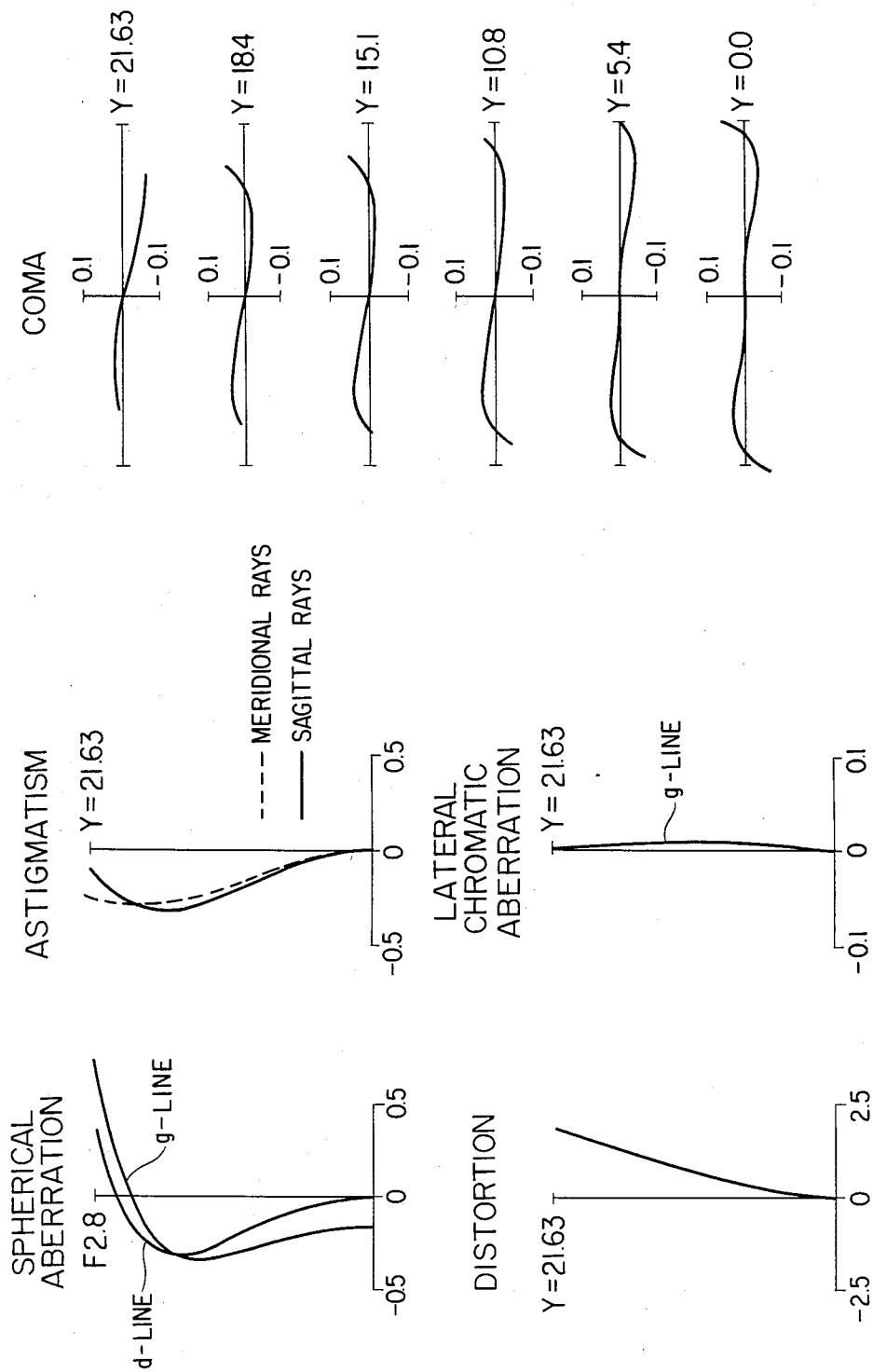
FIG. 18 shows aberrations of the third master lens.
Figure 19:
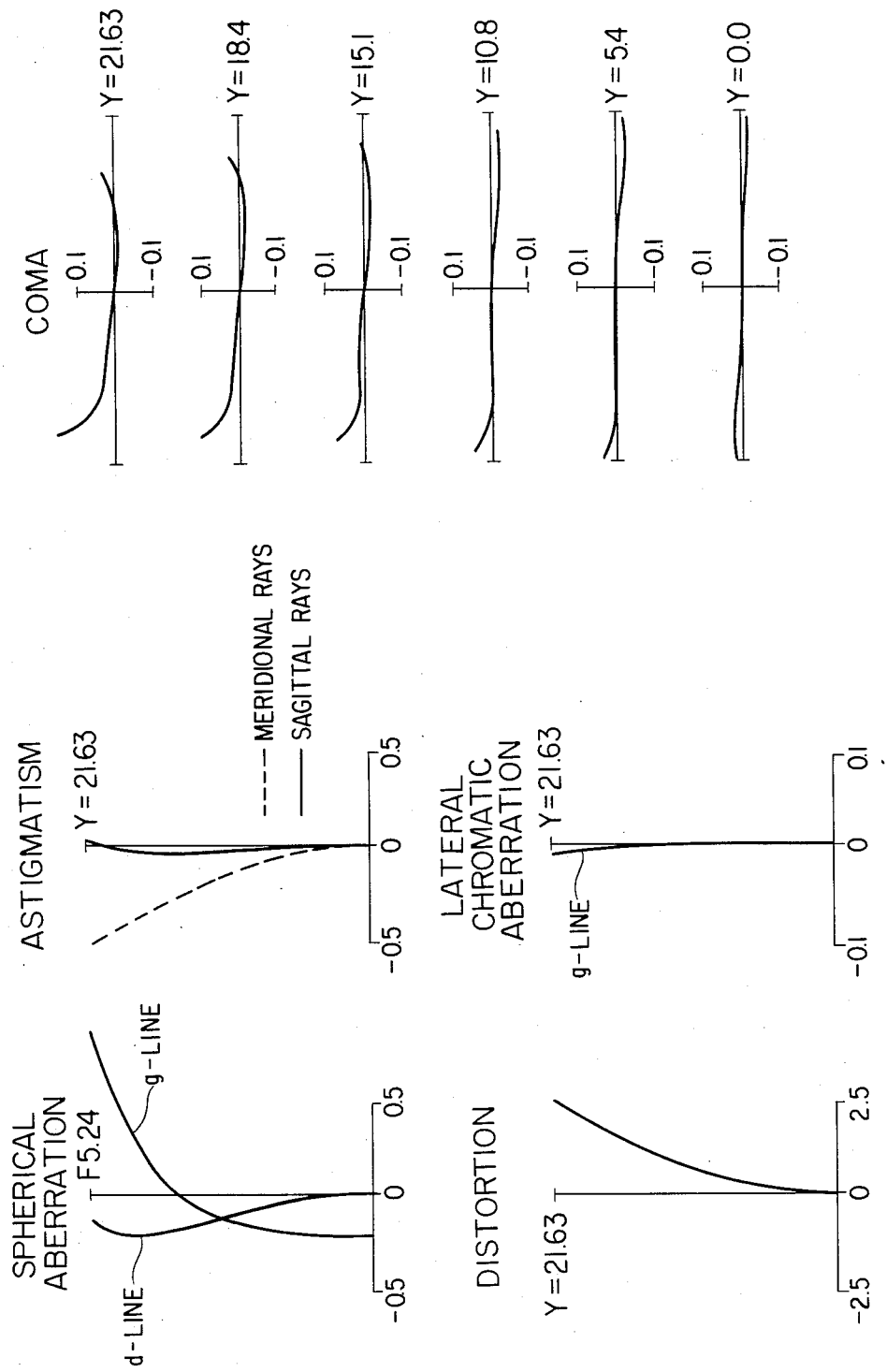
FIG. 19 shows aberrations of the combination of the third master lens and the rear conversion lens of Example 6.

By way of example this rear conversion lens was coupled with a third master lens (ML3) whose data are shown in Table 8. The arrangement of lens components of the coupled master lens and rear conversion lens is shown in FIG. 8. Aberration curves obtained therefrom are shown in FIG. 19. In this embodiment, the coupling distance between the third master lens and the rear conversion lens was 1.3. The composite focal length ft=73, F-number=5.24 and the angle of field $2\omega = 32.2°$. The third master lens ML3 used in this embodiment is a modified (TESSAR) lens with a behind-stop of f=39, F-number=2.8 and the angle of field $2\omega = 57.2°$. The exit pupil is coincident with the position of the stop (S), and the exit angle for the maximum image height Y=21.63 is 36.8°. FIG. 18 shows the aberrations of the third master lens ML3.

Example 7

This example is a rear conversion lens of magnification $\beta = 1.616$ in which the third lens component L3 is a cemented lens composed of a negative lens and a positive lens. Lens data of this example are shown in Table 11.

Figure 21:
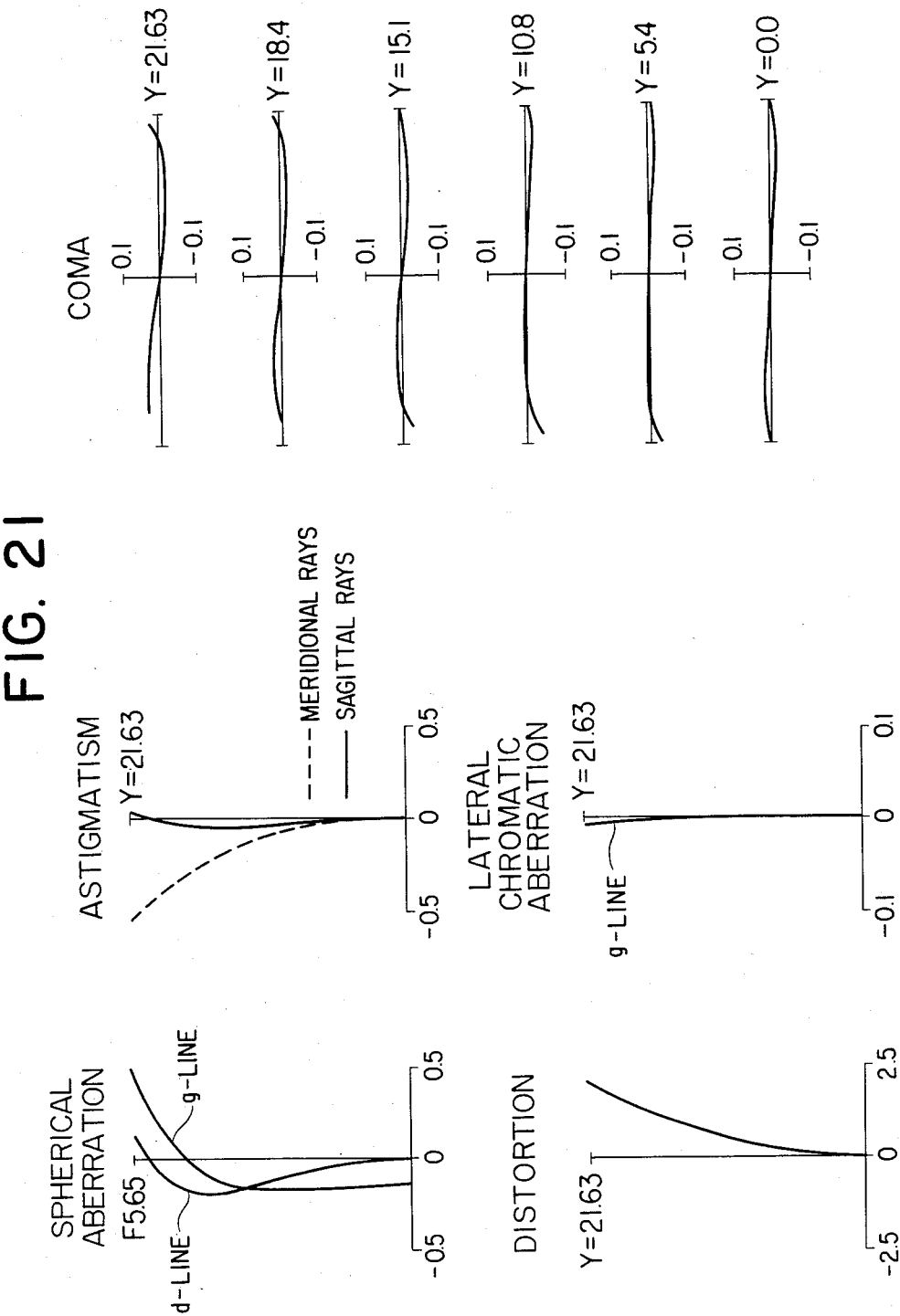
FIG. 21 shows aberrations of the combination of the fourth master lens and the rear conversion lens of Example 7.

By way of example, this rear conversion lens coupled with a fourth master lens was (ML4) whose data are shown in Table 10. Aberration curves obtained therefrom are shown in FIG. 21. The arrangement of lens components of this embodiment is substantially the same as that previously shown in FIG. 8 and, therefore, no further illustration of the arrangement will be needed. The coupling distance between the fourth master lens and the conversion lens was 2.3.

Figure 20:
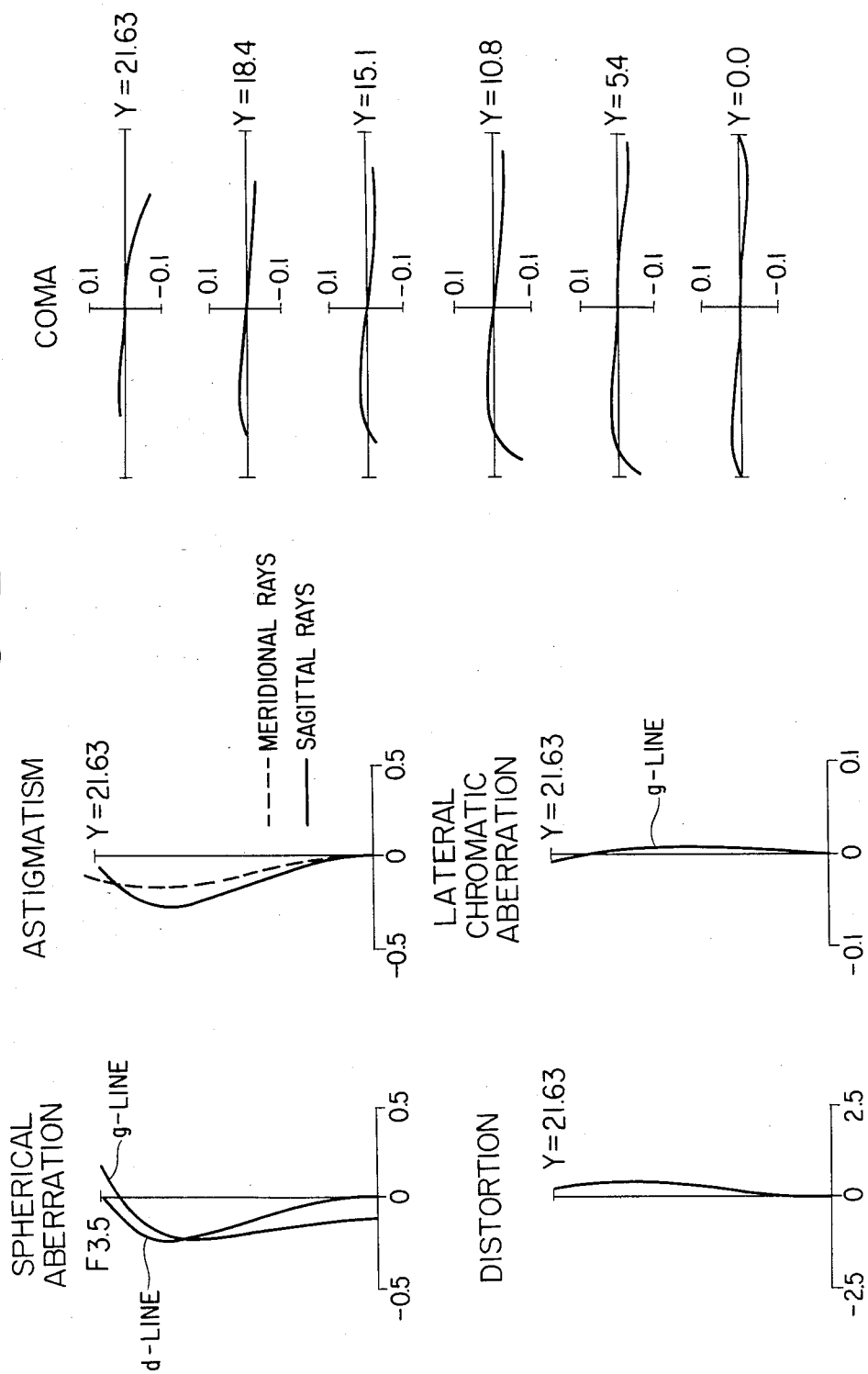
FIG. 20 shows aberrations of the fourth master lens.

The composite focal length ft=63, F-number=5.65 and the angle of view $2\omega = 37.2°$. The fourth master lens (ML4) used herein is a behind-stop, modified (TESSAR) lens of f=39, F-number=3.5 and the angle of field $2\omega = 57.8°$. The exit pupil is just at the stop (S), and the exit angle for the maximum image height Y=21.63 is 35.7°. FIG. 20 shows the aberrations of the fourth master lens (ML4).

Example 8

This example is a rear conversion lens whose data are shown in Table 12. The rear construction of the conversion lens of this example is the same as that of the above Example 7. The magnification $\beta = 1.617$.

Figure 22:
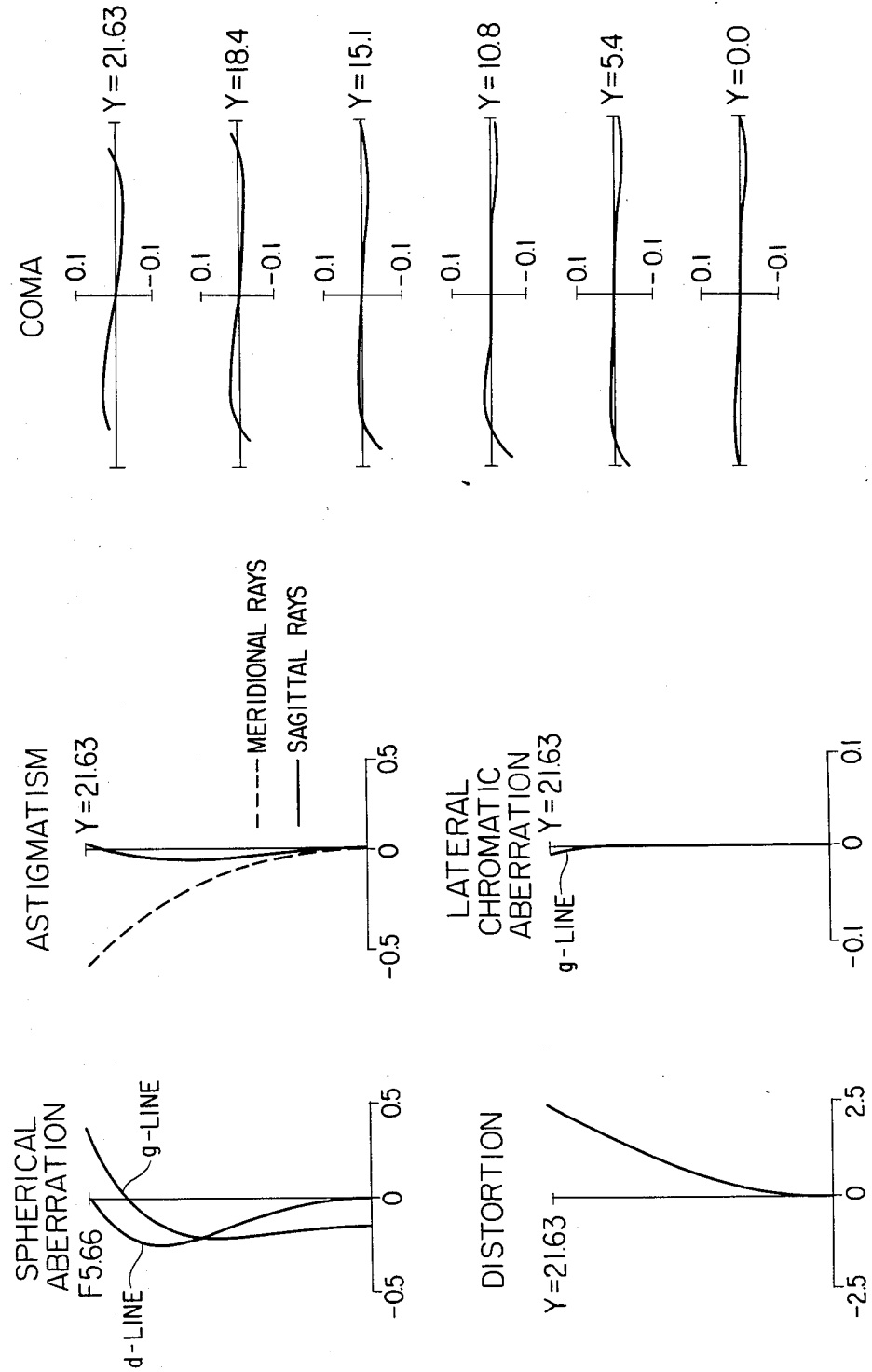
FIG. 22 shows aberrations of the combination of the fourth master lens and the rear conversion lens of Example 8.

By way of example, this rear conversion lens was coupled with the above-shown fourth master lens (ML4). Aberration curves obtained therefrom are shown in FIG. 22. In this embodiment, the coupling distance between the fourth master lens and the rear conversion lens was 2.75. The composite focal length ft=63, F-number=5.66 and the angle of field 2ω=37°. Like the above Examples 7 and 8, this example showed better-corrected aberrations because the master lens was a relatively dark lens of F-number=3.5.

Example 9

This example is a rear conversion lens of magnification of β=1.614 in which the third lens component (L3) is a cemented lens. Lens data of this example are shown in Table 14.

Figure 9:
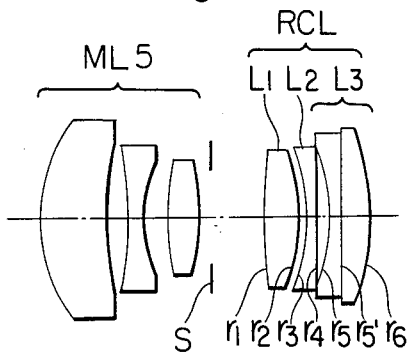
FIG. 9 shows the arrangement of lens components of the coupled Example 9 rear conversion lens and the fifth master lens (a fourth master lens having the same arrangement of lens components)
Figure 23:
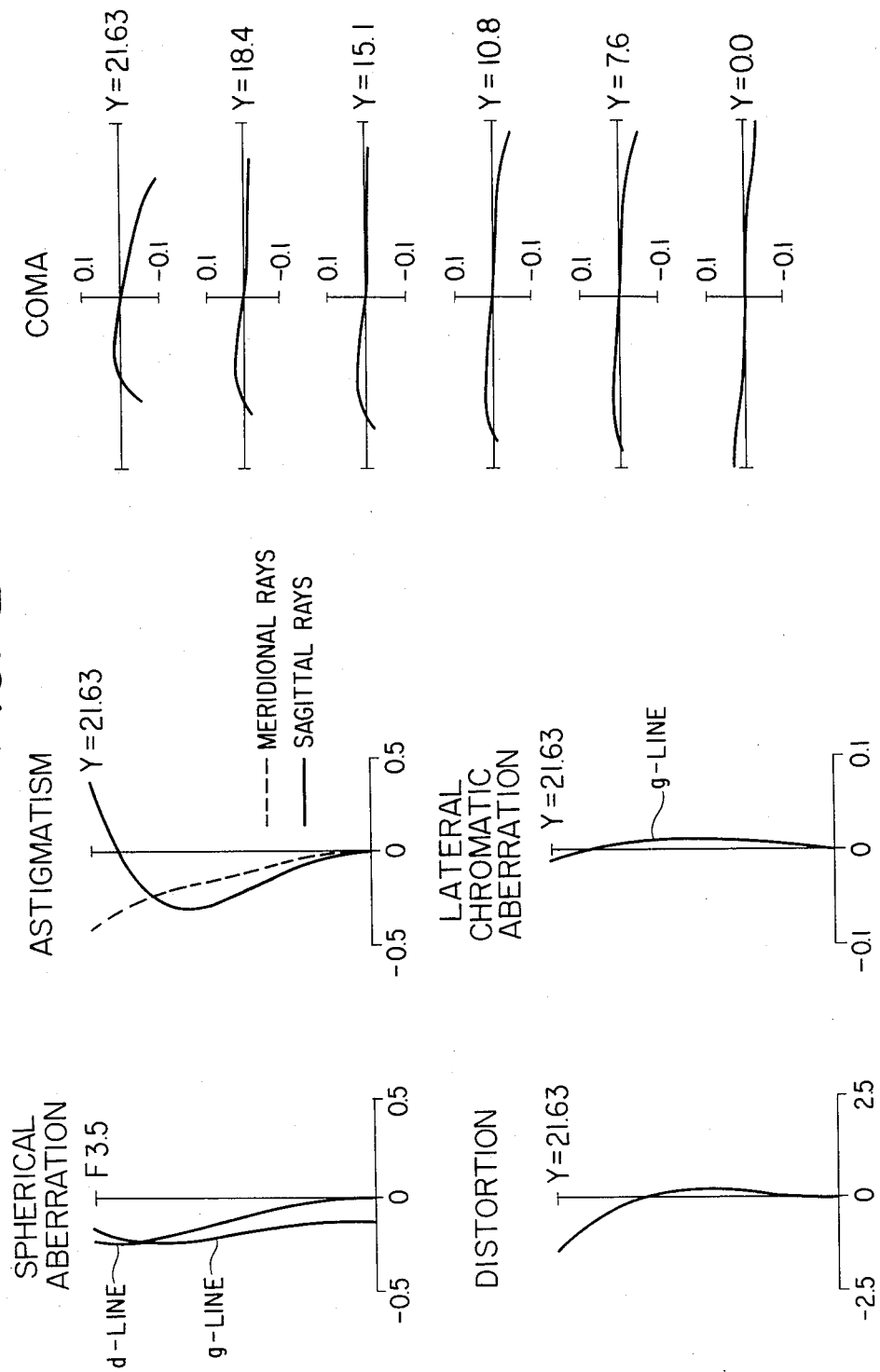
FIG. 23 shows aberrations of the fifth master lens.
Figure 24:
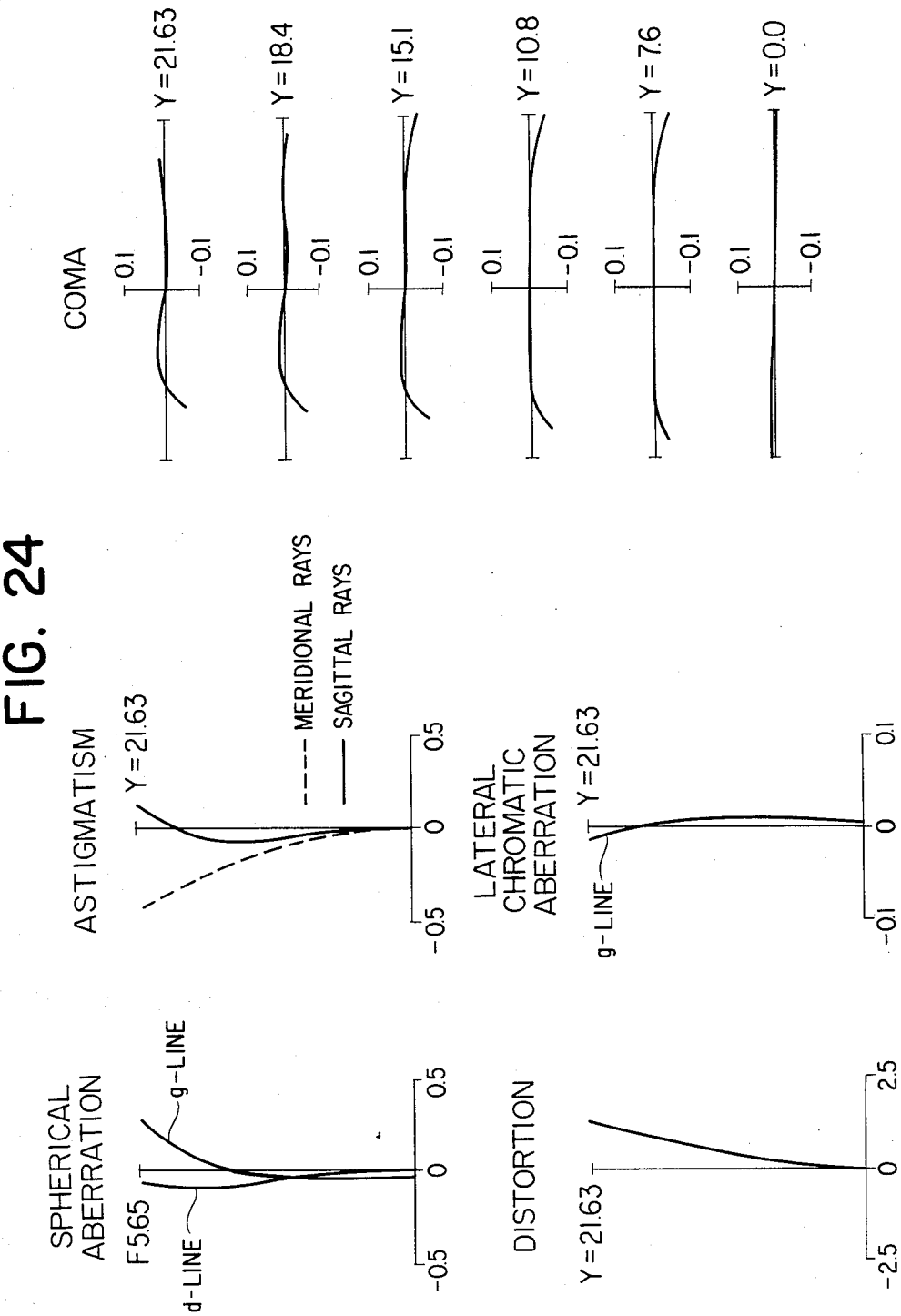
FIG. 24 shows aberrations of the combination of the fifth master lens and the rear conversion lens of Example 9.

By way of example, this rear conversion lens was coupled with a fifth master lens (ML5) whose data are shown in Table 13. FIG. 9 shows the arrangement of components of the coupled master lens and rear conversion lens. Aberration curves obtained therefrom are shown in FIG. 24. In this embodiment, the coupling distance between the fifth master lens and the rear conversion lens was 4.7. Other data were: composite focal length ft=63, F-number=5.65 and the angle of field 2ω=37.4°. The fifth master lens (ML5) used herein is a triplet of f=39, F-number=3.5 and the angle of field 2ω=58.6°. Since it is provided with a behind-stop, the exit pupil is coincident with the position of the stop (S), and the exit angle for the maximum image height Y=21.63 is 35.8°. FIG. 23 shows the aberrations of the fifth master lens (ML5). As compared with other master lenses, the sagittal image plane of this master lens ML5 bulged in the negative direction because it was a triplet. For this reason, the sagittal image plane of the tele-conversion lens was more advantageously corrected in this example than in other examples. The distortion in this embodiment was somewhat negative, which was also advantageous for the correction of aberrations.

Example 10

This example is a rear conversion lens of magnification β=1.634 in which the third lens component (L3) is a cemented lens. Lens data of this example are shown in Table 16.

Figure 10:
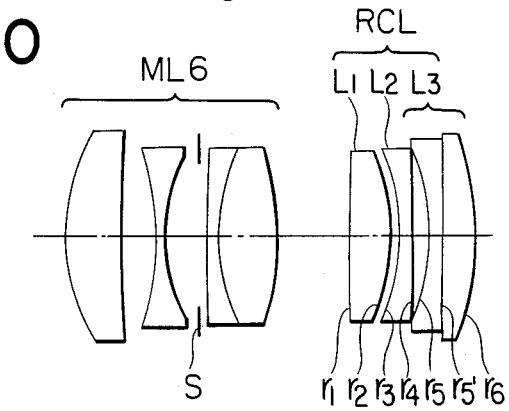
FIG. 10 shows the arrangement of lens components of the coupled Example 10 rear conversion lens and the sixth master lens.
Figure 25:
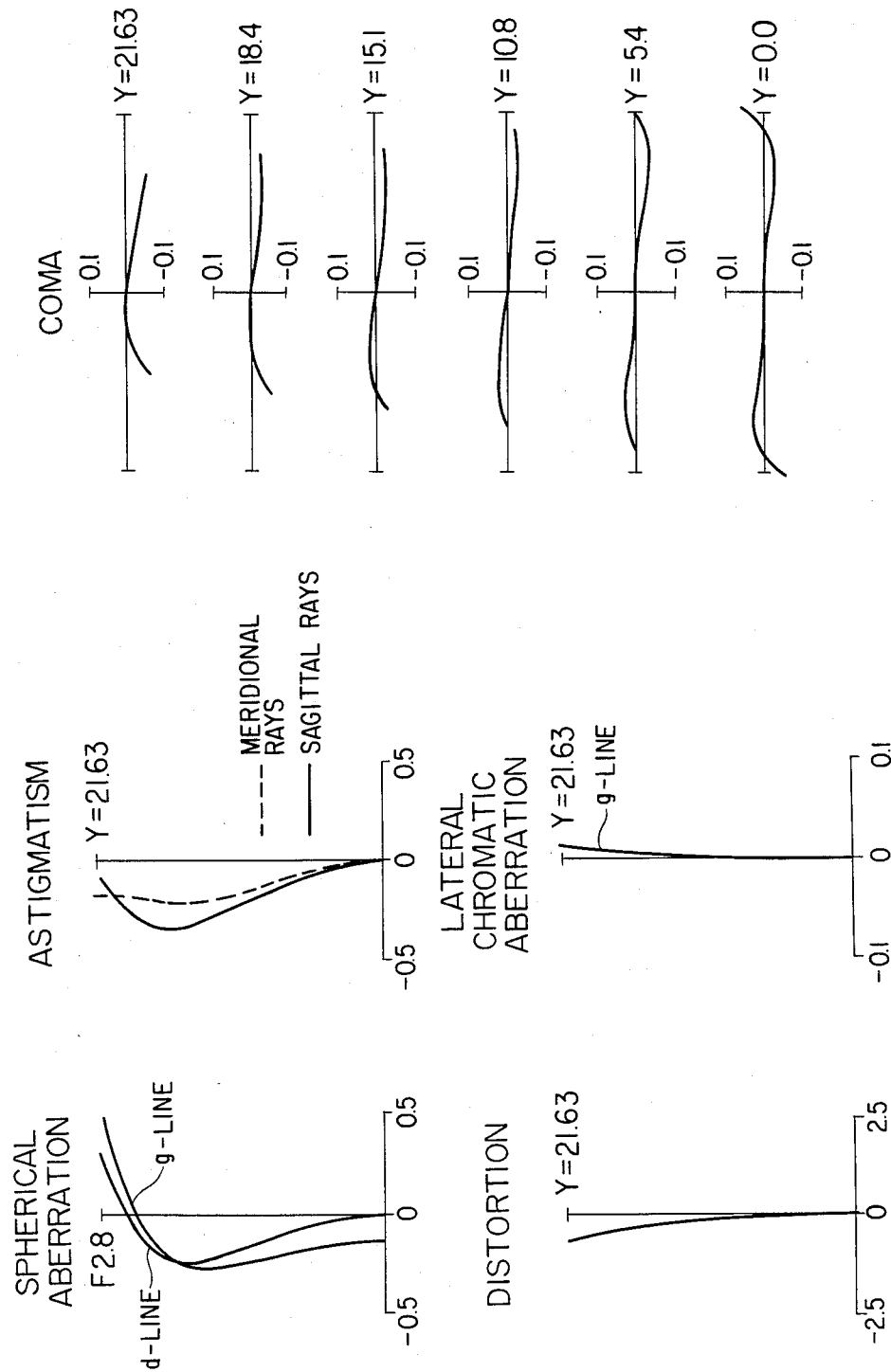
FIG. 25 shows aberrations of the sixth master lens.
Figure 26:
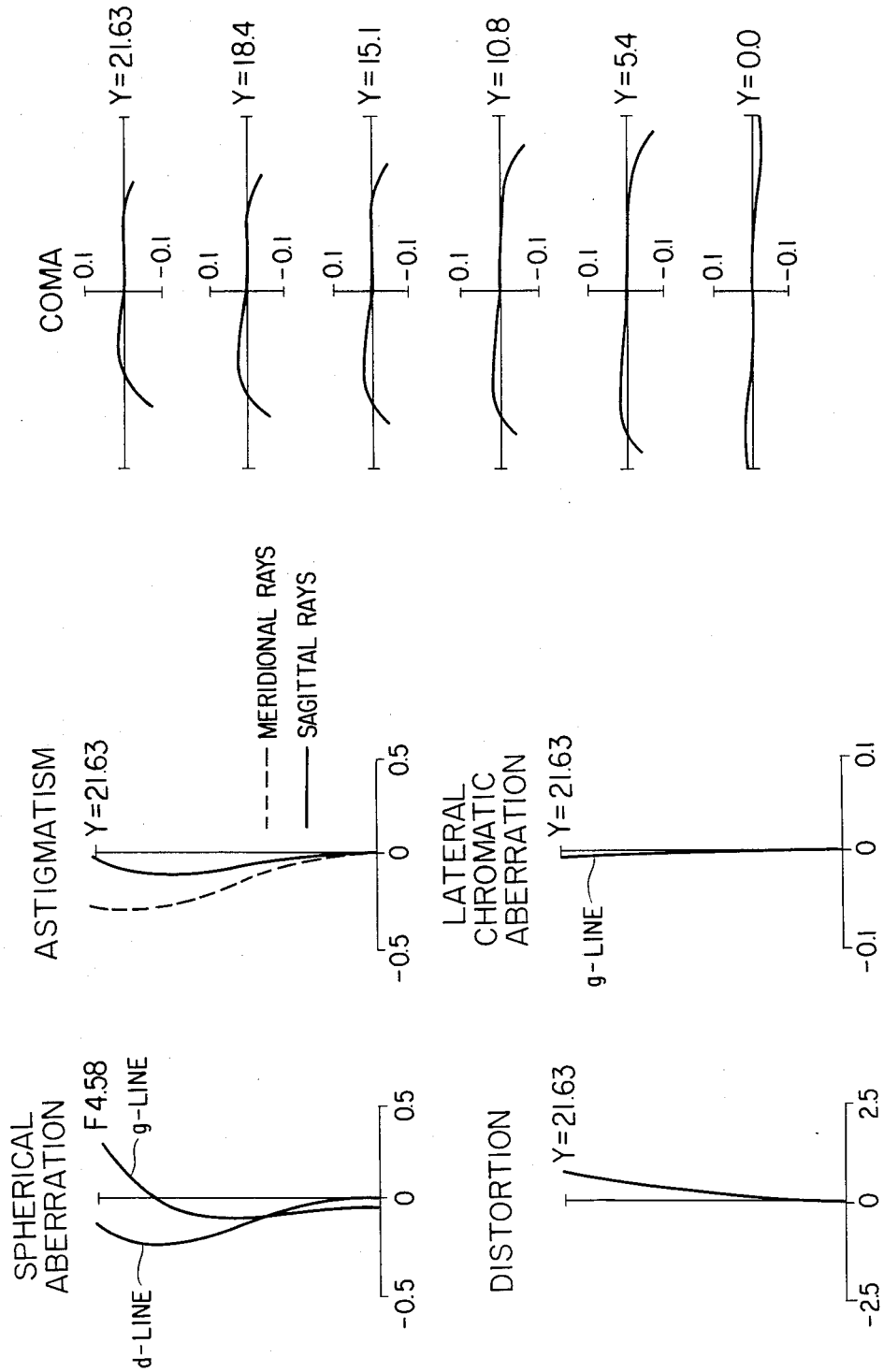
FIG. 26 shows aberrations of the combination of the sixth master lens and the rear conversion lens of Example 10.

By way of example, this rear conversion lens was coupled with a sixth master lens (ML6) whose data are shown in Table 15. FIG. 10 illustrates the arrangement of the coupled master lens and rear conversion lens. Aberration curve obtained therefrom are shown in FIG. 26. In this embodiment, the coupling distance between the sixth master lens and the rear conversion lens was 6. The composite focal length ft=76, F-number=4.58 and the angle of field 2ω=31.6°. The sixth master lens (ML6) is a between-stop (TESSAR) lens of f=46.5, F-number=2.8 and the angle of field 2ω=50.2°. The exit pupil is at 5.8 from the rear-most lens surface toward the object side and, therefore, the exit angle for the maximum image height Y=21.63 is 24.5°. FIG. 25 shows the aberration of the sixth master lens ML6. In all of the above embodiments, Examples 1 to 9, the rear conversion lens according to the invention has been coupled with a behind-stop type of master lens. In contrast, the rear conversion lens of this example has been coupled with a between-stop type of master lens. FIG. 23 demonstrates that well-corrected aberrations have been obtained even when the rear conversion lens of the present invention was coupled with a between stop type of master lens.

Figure 27:
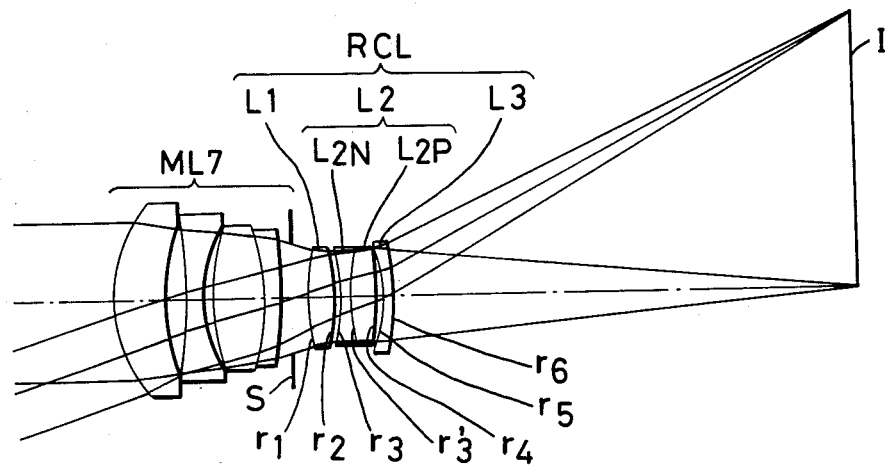
FIG. 27 shows an optical path illustration in the state where the rear conversion lens of Example 11 according to the present invention is mounted to the seventh master lens.
Figure 28:
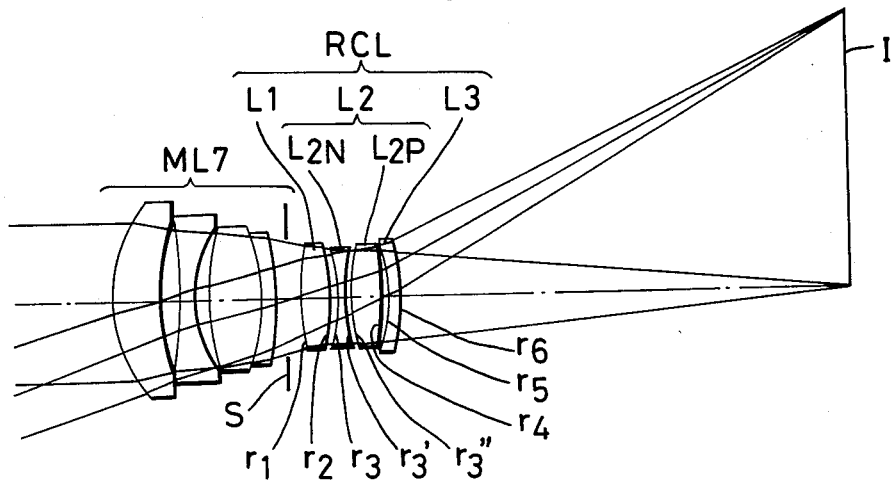
FIG. 28 shows an optical path illustration in the state where the rear conversion lens of Example 15 according to the present invention is mounted to the seventh master lens.

In the following Examples 11 to 15, the second lens component L2 is composed of, in the order from the object side, a negative lens L2N and a positive lens L2P as shown in FIGS. 27 and 28. The negative lens L2N and the positive lens L2P may be a cemented lens or may be separate lenses. In such a structure of Examples 11 to 15, the following condition is preferable as a condition correcting the Petzval Sum:

$$1.1 \times n1 < \frac{n2P + n2N}{2} \quad (11)$$

$$n2P < n2N \quad (12)$$

wherein, n1 is a refractive index of the first lens component L1; n2P and n2N are a refractive index of the positive lens L2P and a refractive index of the negative lens L2N in the second lens component L2, respectively. The entire second lens component L2 functions as a negative lens and has a divergent action. As the negative lens having a high refractive index and the positive lens having a low refractive index are arranged in the second lens component L2 and the refractive power of each of the lenses is made as strong as possible to provide better correction of the Petzval sum, the divergent action becomes stronger. The divergent action of the second lens component acts on distortion and coma and increases them, so that it is necessary to give special consideration to the second lens component.

In order to well correct astigmatism it is desirable to satisfy the following condition:

$$0.3 < r4/r6 < 7 \quad (13)$$

wherein r4 is the curvature radius of the lens surface on the image side of the second lens component and r6 is the curvature radius of the lens surface on the image side of a third lens component.

In the structure as above-stated, as a principal ray of an oblique ray passes through the second lens component and the third lens component, the principal ray is made gradually divergent. If the lower limit of the condition (13) is exceeded, the value r6 becomes too large relative to the value r4, and the divergent action of the lens surface on the image side of the third lens component becomes too strong, so that the tangential image surface becomes positive and astigmatism is produced, and it becomes difficult to obtain a well corrected state. If the upper limit of the condition (13) is exceeded, the value r4 becomes too large relative to the value r6 and the divergent action of the lens surface nearest the image side of the second lens component, so that the tangential image surface becomes positive and it becomes difficult to correct astigmatism. It is desirable in a correction of aberration that the upper limit of the condition (13) be made approx. 4.

It is also desirable to satisfy the following condition:

$$0.4 < \frac{|r3'|}{Y} < 40.0 \quad (14)$$

wherein r3' is a curvature radius of the lens surface on the image side of a negative lens L2N positioned on the object side of the second lens component and Y is a maximum image height.

If the upper limit of the condition (14) is exceeded, it is not possible to correct the Petzval sum, while if the lower limit thereof is exceeded, coma deteriorates due to high order aberration.

The following Examples 11 to 15 are shown to illustrate the present invention.

Lens data of Example 11 are shown in Table 18 in which the magnification $\beta = 1.889$, and second lens component L2 is a cemented lens consisting of, in the order from the object side, a negative lens L2N and a positive lens L2P. By way of example, this rear conversion lens has been coupled with an objective lens referred to as the seventh master lens (ML7) whose data are shown in Table 17. FIG. 27 shows the arrangement of the coupled seventh master lens and rear conversion lens. In FIG. 27, light beams from an infinite object point on axis and from an object point having a maximum angle of view are shown. In this embodiment, the coupling distance between the seventh master lens and the rear conversion lens (which is a vertex distance between a final lens surface of the objective lens and a foremost lens surface of the rear conversion lens) was 2.669. The composite focal length $ft = 68.0$, F-number = 5.4, and the angle of field $2\omega = 34.5°$.

The seventh master lens (ML7), as shown in Table 17, was a behind-stop, modified Tessar lens of $f = 36$, F-number = 2.85, and the angle of field $2\omega = 61.8°$, and a phototaking lens of the type popular in a compact camera. The exit pupil was just at the position of the aperture stop (S) and the exit angle for the maximum image height $Y = 21.63$ was 38.9°.

Lens data of Example 12 are shown in Table 19 in which the magnification $\beta = 1.889$ and the second lens component is a cemented lens consisting of, in the order from the object side, a negative lens L2N and a positive lens L2P. In this embodiment, the coupling distance between the seventh master lens (ML7) and the rear conversion lens was 2.631. The composite focal length $ft = 68.0$, F-number = 5.4 and the angle of field $2\omega = 34.6°$.

Lens data of Example 13 consisting of a similar structure are shown in Table 20. The coupling distance between the seventh master lens and the rear conversion lens was 2.30, F-number = 6.9 and the angle of field $2\omega = 34.4°$.

The arrangements of the coupled seventh master lens ML7 in Examples 12 and 13 are about the same as in FIG. 27 showing Example 11 and are omitted.

Lens data of Example 14 are shown in Table 21 in which the magnification $\beta = 1.889$. The first lens component L1 may be made of plastic material (acryl). If the first or second lens component is made by molding and the periphery thereof is formed with a joggled portion, a distance ring (spacer) for keeping a space distance d2 between the first and second lens components need not be used. The second lens component is a cemented lens consisting of, in the order from the object side, a negative lens L2N and a positive lens L2P in the same fashion as in Examples 11, 12 and 13. The coupling distance between the seventh master lens ML7 and the rear conversion lens was 2.439. The composite focal length $ft = 68.0$, F-number = 5.4, and the angle of field $2\omega = 34.5°$. The lens structure of Example 14 is the same as in Example 11 (FIG. 27).

Lens data of Example 15 are shown in Table 22 in which the magnification $\beta = 1.889$. Positive lenses in the first lens component L1 and the second lens component L2 can be made of plastic material. In this embodiment, the first lens component L1 is formed of acryl and a positive lens L2P in the second lens component L2 is formed of polycarbonate. The negative lens L2N and the positive lens L2P constituting together the second lens component are separated from each other. A distance ring (spacer) is needed for keeping an air spacing between the first lens component and the two lens components L2N, L2P constituting the second lens component subsequent thereto. However, if a lens is molded and the periphery of the lens is joggled, the spacer can be omitted. By way of example, the arrangement of the seventh master lens ML7 shown in the Table 17 coupled to the rear conversion lens in Example 15 is shown in FIG. 28. The coupling distance between the seventh master lens and the rear conversion lens was 2.343. The composite focal length $ft = 68.0$, F-number 5.4 and the angle of field $2\omega = 34.5°$.

In the above examples, it is shown that plastic material can be used for each of the lens components. Particularly in plastic, movement of the focal point is generated by a change in external environment such as temperature, humidity and so on or by aging, and the amount of focal point movement is known to be great. Such a focal point movement can be corrected by moving the whole or a part of the rear conversion lens forward or rearward in the direction of the optical axis of the lens.

Among the above-shown embodiments, Examples 2 to 15 have been those in which one of the three lens components has been constituted of a cemented lens. However, it is to be understood that other lens components may be composed of a cemented lens. Further it is also possible to separate one element from the other element of the cemented lens so as to make it function as an air space lens. By doing so, the freedom in the correction of aberrations can be broadened and the same good correction of aberrations as in the above embodiments can be attained. Although not shown in the above embodiments, it is also to be understood that good optical performance can be assured by the rear conversion lenses according to the invention even when the rear conversion lenses are coupled with (TESSAR) behind-stop master lenses or other known master lenses for a compact camera instead of the above-shown modified (TESSAR) master lenses.

For the combination of a master lens and a rear conversion lens as shown in the above Examples 1 to 15, various focusing methods are possible. In order to focus on a short object, the master lens and the rear conversion lens can be drawn out together as a unit. It is also possible to move the master lens and the rear conversion lens at different speeds for focusing. As a further possible focusing method, only the master lens and the aperture stop can be moved while keeping the rear conversion lens stationary. Otherwise, only the master lens can be moved for focusing while keeping the rear conversion lens and the stop stationary. With the master lens stationary, focusing can also be effected by moving the rear conversion lens and the stop or moving only the rear conversion lens. There may be such a master lens in which the meridional image plane to a short object is apt to become negative. For such a master lens it is also possible to make the rear conversion have a function to correct the meridional image plane of the master lens.

Hereinunder the tables of lens data are given. In the tables, R and r are the radius of curvature of a lens surface, D and d are the lens thickness on axis and the air thickness, n is the refractive index of a lens and $\nu$ is Abbe's number of a lens. The affixed number is ordinal from the object side. Bf is the back focus of the master lens. Bf' is the composite back focus with the rear conversion lens being mounted.

TABLE 1

(1st master lens ML1)
f=35    F-number 2.8    2ω=62.8°

| | | | |
|---|---|---|---|
| R1=11.530 | D1=3.600 | n1=1.77279 | ν1=49.4 |
| R2=25.094 | D2=1.200 | | |
| R3=−55.660 | D3=1.700 | n2=1.71736 | ν2=29.5 |
| R4=10.938 | D4=.900 | | |
| R5=21.265 | D5=3.700 | n3=1.79668 | ν3=45.5 |
| R6=−13.448 | D6=.900 | n4=1.51680 | ν4=64.1 |
| R7=−109.894 | D7=1.000 | | |
| R8=stop | Bf=26.050 | | |

TABLE 2

(Example 1)
β=1.554    f=−58.982
d0=−24.092

| | | | | |
|---|---|---|---|---|
| $L_1$ | r1=159.219 | d1=2.300 | n1=1.59507 | ν1=35.5 |
| | r2=−12.048 | d2=.100 | | |
| $L_2$ | r3=−18.078 | d3=1.120 | n2=1.86994 | ν2=39.8 |
| | r4=−772.607 | d4=1.500 | | |
| $L_3$ | r5=−8.835 | d5=.900 | n3=1.86994 | ν3=39.8 |
| | r6=−12.179 | Bf'=31.523 | | |

Σd=5.92    $f_1$=18.916    $f_2$=−21.294    $f_3$=−42.272

TABLE 3

(Example 2)
β=1.554    f=−58.461
d0=−24.596

| | | | | |
|---|---|---|---|---|
| $L_1$ | r1=86.954 | d1=.900 | n1=1.78797 | ν1=47.5 |
| | r1'=32.070 | d1'=2.400 | n2=1.59507 | ν2=35.5 |
| | r2=−11.833 | d2=.100 | | |
| $L_2$ | r3=−17.677 | d3=.900 | n3=1.90265 | ν3=35.8 |
| | r4=−278.925 | d4=1.500 | | |
| $L_3$ | r5=−8.754 | d5=.900 | n4=1.77279 | ν4=49.4 |
| | r6=−12.416 | Bf'=31.440 | | |

Σd=6.7    $f_1$=18.904    $f_2$=−20.943    $f_3$=−43.008

TABLE 4

(Example 3)
β=1.554    f=−58.836
d0=−24.269

| | | | | |
|---|---|---|---|---|
| $L_1$ | r1=53.281 | d1=2.100 | n1=1.59507 | ν1=35.5 |
| | r2=−12.700 | d2=.100 | | |
| $L_2$ | r3=−16.817 | d3=.900 | n2=1.86994 | ν2=39.8 |
| | r3'=35.360 | d3'=1.400 | n3=1.62004 | ν3=36.3 |
| | r4=−246.404 | d4=1.500 | | |
| $L_3$ | r5=−9.359 | d5=1.200 | n4=1.90265 | ν4=35.8 |
| | r6=−12.467 | Bf'=30.790 | | |

Σd=7.2    $f_1$=17.441    $f_2$=−17.773    $f_3$=−50.914

TABLE 5

(2nd master lens ML2)
f=35    F-number 2.8    2ω=62.4°

| | | | |
|---|---|---|---|
| R1=11.170 | D1=2.000 | n1=1.71300 | ν1=54.0 |
| R2=16.326 | D2=.200 | | |
| R3=13.504 | D3=1.800 | n2=1.77279 | ν2=49.4 |
| R4=25.286 | D4=.850 | | |
| R5=−92.354 | D5=.900 | n3=1.68893 | ν3=31.1 |
| R6=9.841 | D6=1.500 | | |

TABLE 5-continued (2nd master lens ML2)
f=35    F-number 2.8    2ω=62.4°

| | | | |
|---|---|---|---|
| R7=29.228 | D7=3.000 | n4=1.77279 | ν4=49.4 |
| R8=−11.082 | D8=.800 | n5=1.62041 | ν5=60.4 |
| R9=−67.304 | D9=.900 | | |
| R10=stop | Bf=25.809 | | |

TABLE 6

(Example 4)
β=2.0    f=−38.837
d0=−23.799

| | | | | |
|---|---|---|---|---|
| $L_1$ | r1=32.771 | d1=2.500 | n1=1.54765 | ν1=42.2 |
| | r2=−12.687 | d2=.100 | | |
| $L_2$ | r3=−32.756 | d3=.900 | n2=1.84042 | ν2=43.3 |
| | r4=140.871 | d4=1.000 | | |
| $L_3$ | r5=−10.017 | d5=.900 | n3=1.88067 | ν3=41.1 |
| | r5'=40.882 | d5'=2.300 | n4=1.67270 | ν4=32.2 |
| | r6=−21.631 | Bf'=37.789 | | |

Σd=7.7    $f_1$=17.033    $f_2$=−31.548    $f_3$=−17.597

TABLE 7

(Example 5)
β=2.0    f=−37.625
d0=−24.062

| | | | | |
|---|---|---|---|---|
| $L_1$ | r1=36.460 | d1=2.500 | n1=1.54765 | ν1=42.2 |
| | r2=−12.391 | d2=.100 | | |
| $L_2$ | r3=−19.307 | d3=.900 | n2=1.90265 | ν2=35.8 |
| | r3'=13.129 | d3'=2.000 | n3=1.75520 | ν3=27.6 |
| | r4=−306.261 | d4=1.000 | | |
| $L_3$ | r5=−8.863 | d5=.900 | n4=1.74810 | ν4=52.3 |
| | r6=−14.949 | Bf'=37.751 | | |

Σd=7.4    $f_1$=17.198    $f_2$=−18.003    $f_3$=−31.069

TABLE 8

(3rd master lens ML3)
f=39    F-number 2.8    2ω=57.2°

| | | | |
|---|---|---|---|
| R1=12.663 | D1=4.121 | n1=1.77279 | ν1=49.4 |
| R2=27.771 | D2=1.381 | | |
| R3=−62.774 | D3=1.559 | n2=1.71736 | ν2=29.5 |
| R4=11.975 | D4=1.002 | | |
| R5=23.763 | D5=4.121 | n3=1.79668 | ν3=45.5 |
| R6=−14.826 | D6=1.002 | n4=1.51680 | ν4=64.1 |
| R7=−135.534 | D7=1.000 | | |
| R8=stop | Bf=28.919 | | |

TABLE 9

(Example 6)
β=1.87    f=−48.972
d0=−27.619

| | | | | |
|---|---|---|---|---|
| $L_1$ | r1=54.973 | d1=2.800 | n1=1.53256 | ν1=45.9 |
| | r2=−13.928 | d2=.400 | | |
| $L_2$ | r3=−16.928 | d3=1.000 | n2=1.84042 | ν2=43.3 |
| | r4=−75.977 | d4=1.600 | | |
| $L_3$ | r5=−15.355 | d5=.800 | n3=1.88300 | ν3=41.0 |
| | r5'=51.783 | d5'=2.500 | n4=1.69895 | ν4=30.1 |
| | r6=−26.420 | Bf'=40.885 | | |

Σd=9.1    $f_1$=21.165    $f_2$=−21.118    $f_3$=−31.580

TABLE 10

(4th master lens ML4)
f=39    F-number 3.5    2ω=57.8°

| | | | |
|---|---|---|---|
| R1=12.176 | D1=3.900 | n1=1.76684 | ν1=46.8 |

TABLE 10-continued (4th master lens ML4)
f=39  F-number 3.5  2ω=57.8°

| | | |
|---|---|---|
| R2=21.570 | D2=1.300 | |
| R3=−47.802 | D3=1.400 | n2=1.69895 ν2=30.1 |
| R4=11.900 | D4=.800 | |
| R5=20.732 | D5=4.200 | n3=1.78797 ν3=47.5 |
| R6=−14.495 | D6=1.100 | n4=1.51680 ν4=64.1 |
| R7=−70.487 | D7=1.000 | |
| R8=stop | Bf=30.134 | |

TABLE 11

(Example 7)
β=1.616  f=−60.558 d0=−27.834

L₁ { r1=52.453  d1=2.800  n1=1.58144  ν1=40.8
    { r2=−13.650  d2=.630

L₂ { r3=−14.010  d3=1.000  n2=1.86994  ν2=39.8
    { r4=−143.863  d4=.600

L₃ { r5=−23.128  d5=1.000  n3=1.86994  ν3=39.8
    { r5′=116.966  d5′=2.000  n4=1.72825  ν4=28.3
    { r6=−35.739  Bf′=36.538

Σd=8.03  f₁=18.923  f₂=−17.906  f₃=−58.319

TABLE 12

(Example 8)
β=1.617  f=−58.338 d0=−27.384

L₁ { r1=43.201  d1=2.800  n1=1.57501  ν1=41.6
    { r2=−13.670  d2=.640

L₂ { r3=−13.936  d3=1.000  n2=1.86994  ν2=39.8
    { r4=−799.710  d4=.650

L₃ { r5=−24.785  d5=.900  n3=1.84042  ν3=43.3
    { r5′=92.380  d5′=2.100  n4=1.69895  ν4=30.1
    { r6=−35.649  Bf′=35.446

Σd=8.09  f₁=18.390  f₂=−16.313  f₃=−68.147

TABLE 13

(5th master lens ML5)
f=39  F-number 3.5  2ω=58.6°

| | | |
|---|---|---|
| R1=14.866 | D1=5.700 | n1=1.80411  ν1=46.4 |
| R2=34.197 | D2=1.500 | |
| R3=−37.862 | D3=1.500 | n2=1.74000  ν2=28.3 |
| R4=15.883 | D4=2.100 | |
| R5=42.799 | D5=2.400 | n3=1.84042  ν3=43.3 |
| R6=−25.641 | D6=1.000 | |
| R7=stop | Bf=30.028 | |

TABLE 14

(Example 9)
β=1.614  f=−57.412 d0=−25.328

L₁ { r1=77.231  d1=2.900  n1=1.54814  ν1=45.9
    { r2=−14.851  d2=.600

L₂ { r3=−18.297  d3=1.000  n2=1.84042  ν2=43.3
    { r4=−106.425  d4=1.100

L₃ { r5=−14.196  d5=1.000  n3=1.86994  ν3=39.8
    { r5′=.000  d5′=2.300  n4=1.71736  ν4=29.5
    { r6=−22.135  Bf′=32.422

Σd=8.9  f₁=22.980  f₂=−26.428  f₃=−39.758

TABLE 15

(6th master lens ML6)
f=46.5  F-number 2.8  2ω=50.2

| | | |
|---|---|---|
| R1=18.000 | D1=4.600 | n1=1.71300  ν1=54.0 |
| R2=190.700 | D2=2.700 | |
| R3=−38.790 | D3=.750 | n2=1.62004  ν2=36.3 |
| R4=15.900 | D4=3.000 | |
| R5=stop | D5=0.500 | |
| R6=2000.000 | D6=.900 | n3=1.58215  ν3=42.0 |
| R7=18.800 | D7=4.900 | n4=1.72000  ν4=50.3 |
| R8=−26.270 | Bf=37.934 | |

TABLE 16

(Example 10)
β=1.634  f=−70.459 d0=−31.934

L₁ { r1=142.030  d1=3.500  n1=1.54814  ν1=45.9
    { r2=−17.417  d2=.750

L₂ { r3=−20.705  d3=1.200  n2=1.84042  ν2=43.3
    { r4=−88.185  d4=1.430

L₃ { r5=−18.340  d5=1.000  n3=1.84042  ν3=43.3
    { r5′=.000  d5′=2.600  n4=1.68893  ν4=31.1
    { r6=−29.039  Bf′=41.785

Σd=10.48  f₁=28.526  f₂=−32.459  f₃=−50.413

TABLE 17

(7th master lens ML7)
f=36.0  F-number 2.85  2ω=61.8°

| | | |
|---|---|---|
| R1=11.998 | d1=4.200 | n1=1.74443  ν1=49.53 |
| R2=24.470 | d2=1.287 | |
| R3=−49.596 | d3=1.400 | n2=1.71736  ν2=29.48 |
| R4=11.502 | d4=0.824 | |
| R5=20.543 | d5=4.500 | n3=1.79668  ν3=45.42 |
| R6=−13.936 | d6=0.900 | n4=1.51680  ν4=64.12 |
| R7=−77.687 | d7=1.000 | |
| R8=Stop | Bf=26.852 | |

TABLE 18

(Example 11)
β=1.889  f=−42.674 d0=−25.183

L1 { r1=46.200  d1=2.100  n1=1.46450  ν1=65.79
    { r2=−13.198  d2=0.300

L2 { r3=−19.476  d3=0.900  n2=1.84042  ν2=43.30
    { r3′=19.290  d3′=2.100  n3=1.69895  ν3=30.09
    { r4=−33.812  d4=0.500

L3 { r5=−12.546  d5=0.900  n4=1.74443  ν4=49.53
    { r6=−40.551  Bf′=38.368

Σd=6.8  f₁=22.351  f₂=−35.413  f₃=−24.742

TABLE 19

(Example 12)
β=1.889  f=−42.968 d0=−25.412

L1 { r1=63.666  d1=2.300  n1=1.53172  ν1=49.12
    { r2=−13.542  d2=0.250

L2 { r3=−19.878  d3=0.900  n2=1.86994  ν2=39.78
    { r3′=21.741  d3′=2.200  n3=1.72825  ν3=28.34
    { r4=−39.429  d4=0.500

L3 { r5=−12.366  d5=0.900  n4=1.84042  ν4=43.30
    { r6=−31.580  Bf′=38.524

Σd=7.05  f₁=21.22  f₂=−32.923  f₃=−24.711

TABLE 20

(Example 13)
$\beta = 1.889 \quad f = -44.0$ d0 = −26.321

L1
- r1 = 38.362, d1 = 2.100, n1 = 1.46450, ν1 = 65.79
- r2 = −13.257, d2 = 0.300

L2
- r3 = −20.081, d3 = 0.900, n2 = 1.79668, ν2 = 45.42
- r3′ = 11.998, d3′ = 2.100, n3 = 1.68893, ν3 = 31.15
- r4 = −51.157, d4 = 0.500

L3
- r5 = −12.113, d5 = 0.900, n4 = 1.74400, ν4 = 45.06
- r6 = −30.820, Bf′ = 40.252

$\Sigma d = 6.8 \quad f_1 = 21.5 \quad f_2 = -29.2 \quad f_3 = -27.4$

TABLE 21

(Example 14)
$\beta = 1.889 \quad f = -42.372$ d0 = −25.412

L1
- r1 = 41.830, d1 = 2.300, n1 = 1.49108, ν1 = 57.57
- r2 = −13.524, d2 = 0.250

L2
- r3 = −19.219, d3 = 0.900, n2 = 1.78797, ν2 = 47.53
- r3′ = 14.754, d3′ = 2.200, n3 = 1.64831, ν3 = 33.77
- r4 = −44.315, d4 = 0.500

L3
- r5 = −12.596, d5 = 0.900, n4 = 1.78797, ν4 = 47.53
- r6 = −32.462, Bf′ = 38.260

$\Sigma d = 7.05 \quad f_1 = 21.10 \quad f_2 = -28.785 \quad f_3 = -26.655$

TABLE 22

(Example 15)
$\beta = 1.889 \quad f = -42.458$ d0 = −25.508

L1
- r1 = 36.271, d1 = 2.300, n1 = 1.49108, ν1 = 57.57
- r2 = −13.678, d2 = 0.200

L2
- r3 = −19.230, d3 = 0.900, n2 = 1.78797, ν2 = 47.53
- r3′ = 22.552, d3′ = 0.300
- r3″ = 24.687, d3″ = 2.2, n3 = 1.58518, ν3 = 30.24
- r4 = −38.361, d4 = 0.500

L3
- r5 = −12.782, d5 = 0.900, n4 = 1.78797, ν4 = 47.53
- r6 = −34.040, Bf′ = 38.099

$\Sigma d = 7.3 \quad f_1 = 20.537 \quad f_2 = -28.670 \quad f_3 = -26.47$

Spherical aberration, astigmatism, distortion, lateral chromatic aberration and coma shown in FIGS. 11 to 26 were measured to the d-ray ($\lambda = 587.6$ nm). As for spherical aberration, there are also shown those to the g-ray ($\lambda = 435.8$ nm) in FIGS. 11 to 26.

As readily understood from the foregoing, the present invention has realized a compact rear conversion lens which can maintain excellent image-forming performance even at relatively high magnification in the range of 1.5 to 2.0. The compact structure enables the rear conversion lens to be easily incorporated into the body of a so-called compact camera. Therefore, it is now possible to easily and conveniently change the focal length of the compact camera without any accompanying reduction in the image-forming performance of the master taking lens of the camera. It is obvious to those skilled in the art that the present invention is of high utility.

We claim:

1. A rear conversion lens to be mounted in between an objective lens and a determined image plane to produce a composite focal length longer than the focal length of said objective lens itself, said rear conversion lens comprising, in the order from the object side:

a first lens component of positive focal length with the image-side lens surface being convex toward the image side;

a second lens component of negative focal length with the object-side lens surface being convex toward the image side; and a third lens component of negative focal length in the shape of a meniscus convex toward the image side, wherein the conversion lens satisfies the conditions:

$$0.2 < r2/d0 < 0.8 \tag{1}$$

$$-0.35 < r3/r4 < 0.94 \tag{2}$$

$$|r5| < |r6| \tag{3}$$

$$0.1 < f2/f3 < 3.0 \tag{4}$$

wherein, r1 and r2 are curvature radii of the object-side and image-side lens surfaces of the first lens component;

r3 and r4 are curvature radii of the object-side and image side lens surfaces of the second lens component;

r5 and r6 are curvature radii of the object-side and image-side lens surfaces of the third lens component;

—d0 is the distance from the rear focal point of said object lens to the apex of the object-side lens surface of said first lens component;

f2 is the focal length of said second lens component; and f3 is the focal length of said third lens component.

2. A rear conversion lens according to claim 2, wherein said conversion lens further satisfies the conditions:

$$0.25 < \frac{-r5}{Y} < 1.50 \tag{5}$$

$$0.15 < \frac{\Sigma d}{Y} < 1.2 \tag{6}$$

wherein,

Y is the maximum image height on said image plane; and

Σd is the distance from the apex of the front-most lens surface to the apex of the rear-most lens surface of said rear conversion lens.

3. A rear conversion lens according to claim 3, wherein said first lens component satisfies the condition:

$|r1/r2| > 1.5$ wherein, r1 is the curvature radius of the object-side surface and r2 is the curvature radius of the image-side surface of said first lens component.

4. A rear conversion lens according to claim 3, wherein said first, second and third lens components are each composed of a single lens so as to satisfy the conditions:

$$n_1 < 1.68 \tag{7}$$

$$1.69 < n_2 \tag{8}$$

$$n_1 < n_3 \tag{9}$$

wherein, $n_1$, $n_2$ and $n_3$ are refractive indexes of said first, second and third lens components respectively.

5. A rear conversion lens according to claim 4 as represented by the following numerical data:

| $\beta=1.554$ | | $f=-58.982$ | |
|---|---|---|---|
| | $d0=-24.092$ | | |
| $L_1$ { r1=159.219 | d1=2.300 | n1=1.59507 | $\nu$1=35.5 |
| r2=−12.048 | d2=.100 | | |
| $L_2$ { r3=−18.078 | d3=1.120 | n2=1.86994 | $\nu$2=39.8 |
| r4=−772.607 | d4=1.500 | | |
| $L_3$ { r5=−8.835 | d5=.900 | n3=1.86994 | $\nu$3=39.8 |
| r6=−12.179 | Bf'=31.523 | | |
| | $f_1=18.916$ | | |
| $\Sigma d=5.92$ | $f_2=-21.294$ | $f_3=-42.272$ | | wherein,
r is curvature radii of the respective lens surfaces;
d is lens thickness on axis and air thickness;
n is refractive index;
$\nu$ is Abbe's number;
affixed number is ordinal from the object side; and
Bf' is back focus after mounting the rear conversion lens;
f1, f2 and f3 are focal lengths of the first, second and third lens components L1, L2 and L3 respectively;
$\beta$ is magnification and $\Sigma d$ is the distance from the apex of the front-most lens surface to the apex of the rear-most lens surface of the rear conversion lens.

6. A rear conversion lens according to claim 3, wherein at least one of said first, second and third lens components is composed of a cemented lens and the average refractive indexes of said three components, N1, N2 and N3 are selected so as to satisfy the conditions:

$$N1 < N2$$

$$N1 < N3$$

7. A rear conversion lens according to claim 6 as represented by the following numerical data:

| $\beta=1.554$ | | $f=-58.461$ | |
|---|---|---|---|
| | $d0=-24.596$ | | |
| $L_1$ { r1=86.954 | d1=.900 | n1=1.78797 | $\nu$1=47.5 |
| r1'=32.070 | d1'=2.400 | n2=1.59507 | $\nu$2=35.5 |
| r2=−11.833 | d2=.100 | | |
| $L_2$ { r3=−17.677 | d3=.900 | n3=1.90265 | $\nu$3=35.8 |
| r4=−278.925 | d4=1.500 | | |
| $L_3$ { r5=−8.754 | d5=.900 | n4=1.77279 | $\nu$4=49.4 |
| r6=−12.416 | Bf'=31.440 | | |
| | $f_1=18.904$ | | |
| $\Sigma d=6.7$ | $f_2=-20.943$ | $f_3=-43.008$ | | wherein,
r is curvature radii of the respective lens surfaces;
d is lens thickness on axis and air thickness;
n is refractive index;
$\nu$ is Abbe's number;
affixed number is ordinal from the object side; and
Bf' is back focus after mounting the rear conversion lens;
f1, f2 and f3 are focal lengths of the first, second and third lens components L1, L2 and L3 respectively;
$\beta$ is magnification and $\Sigma d$ is the distance from the apex of the front-most lens surface to the apex of the rear-most lens surface of the rear conversion lens.

8. A rear conversion lens according to claim 6 as represented by the following numerical data:

| $\beta=1.554$ | | $f=-58.836$ | |
|---|---|---|---|
| | $d0=-24.269$ | | |
| $L_1$ { r1=53.281 | d1=2.100 | n1=1.59507 | $\nu$1=35.5 |
| r2=−12.700 | d2=.100 | | |
| $L_2$ { r3=−16.817 | d3=.900 | n2=1.86994 | $\nu$2=39.8 |
| r3'=35.360 | d3'=1.400 | n3=1.62004 | $\nu$3=36.3 |
| r4=−246.404 | d4=1.500 | | |
| $L_3$ { r5=−9.359 | d5=1.200 | n4=1.90265 | $\nu$4=35.8 |
| r6=−12.467 | Bf'=30.790 | | |
| | $f_1=17.441$ | | |
| $\Sigma d=7.2$ | $f_2=-17.773$ | $f_3=-50.914$ | | wherein,
r is curvature radii of the respective lens surfaces;
d lens thickness on axis and air thickness;
n is refractive index;
$\nu$ is Abbe's number;
affixed number is ordinal from the object side; and
Bf' is back focus after mounting the rear conversion lens;
f1, f2 and f3 are focal lengths of the first, second and third lens components L1, L2 and L3 respectively;
$\beta$ is magnification and $\Sigma d$ is the distance from the apex of the front-most lens surface to the apex of the rear-most lens surface of the rear conversion lens.

9. A rear conversion lens according to claim 6 as represented by the following numerical data:

| $\beta=2.0$ | | $f=-38.837$ | |
|---|---|---|---|
| | $d0=-23.799$ | | |
| $L_1$ { r1=32.771 | d1=2.500 | n1=1.54765 | $\nu$1=42.2 |
| r2=−12.687 | d2=.100 | | |
| $L_2$ { r3=−32.756 | d3=.900 | n2=1.84042 | $\nu$2=43.3 |
| r4=140.871 | d4=1.000 | | |
| $L_3$ { r5=−10.017 | d5=.900 | n3=1.88067 | $\nu$3=41.1 |
| r5'=40.882 | d5'=2.300 | n4=1.67270 | $\nu$4=32.2 |
| r6=−21.631 | Bf'=37.789 | | |
| $\Sigma d=7.7$ | f1=17.033 | f2=−31.548 | f3=−17.597 | wherein,
r is curvature radii of the respective lens surfaces;
d is lens thickness on axis and air thickness;
n is refractive index;
$\nu$ is Abbe's number;
affixed number is ordinal from the object side; and
Bf' is back focus after mounting the rear conversion lens;
f1, f2 and f3 are focal lengths of the first, second and third lens components L1, L2 and L3 respectively;
$\beta$ is magnification and $\Sigma d$ is the distance from the apex of the front-most lens surface to the apex of the rear-most lens surface of the rear conversion lens.

10. A rear conversion lens according to claim 6 as represented by the following numerical data:

| | $\beta=2.0$ | $f=-37.625$ | |
|---|---|---|---|
| | | $d0=-24.062$ | |
| $L_1$ | r1=36.460 | d1=2.500 | n1=1.54765 ν1=42.2 |
| | r2=−12.391 | d2=.100 | |
| $L_2$ | r3=−19.307 | d3=.900 | n2=1.90265 ν2=35.8 |
| | r3′=13.129 | d3′=2.000 | n3=1.75520 ν3=27.6 |
| | r4=−306.261 | d4=1.000 | |
| $L_3$ | r5=−8.863 | d5=.900 | n4=1.74810 ν4=52.3 |
| | r6=−14.949 | Bf′=37.751 | |
| Σd=7.4 | f1=17.198 | f2=−18.003 | f3=−31.069 | wherein,
 r is curvature radii of the respective lens surfaces;
 d is lens thickness on axis and air thickness;
 n is refractive index;
 ν is Abbe's number;
 affixed number is ordinal from the object side; and
 Bf′ is back focus after mounting the rear conversion lens;
 f1, f2 and f3 are focal lengths of the first, second and third lens components L1, L2 and L3 respectively;
 β is magnification and Σd is the distance from the apex of the front-most lens surface to the apex of the rear-most lens surface of the rear conversion lens.

11. A rear conversion lens according to claim 6 as represented by the following numerical data:

| | $\beta=1.87$ | $f=-48.972$ | |
|---|---|---|---|
| | | $d0=-27.619$ | |
| $L_1$ | r1=54.973 | d1=2.800 | n1=1.53256 ν1=45.9 |
| | r2=−13.928 | d2=.400 | |
| $L_2$ | r3=−16.928 | d3=1.000 | n2=1.84042 ν2=43.3 |
| | r4=−75.977 | d4=1.600 | |
| $L_3$ | r5=−15.355 | d5=.800 | n3=1.88300 ν3=41.0 |
| | r5′=51.783 | d5′=2.500 | n4=1.69895 ν4=30.1 |
| | r6=−26.420 | Bf′=40.885 | |
| Σd=9.1 | f1=21.165 | f2=−26.118 | f3=−31.580 | wherein,
 r is curvature radii of the respective lens surfaces;
 d is lens thickness on axis and air thickness;
 n is refractive index;
 ν is Abbe's number;
 affixed number is ordinal from the object side; and
 Bf′ is back focus after mounting the rear conversion lens;
 f1, f2 and f3 are focal lengths of the first, second and third lens components L1, L2 and L3 respectively;
 β is magnification and Σd is the distance from the apex of the front-most lens surface to the apex of the rear-most lens surface of the rear conversion lens.

12. A rear conversion lens according to claim 6 as represented by the following numerical data:

| | $\beta=1.616$ | $f=-60.558$ | |
|---|---|---|---|
| | | $d0=-27.834$ | |
| $L_1$ | r1=52.453 | d1=2.800 | n1=1.58144 ν1=40.8 |
| | r2=−13.650 | d2=.630 | |
| $L_2$ | r3=−14.010 | d3=1.000 | n2=1.86994 ν2=39.8 |
| | r4=−143.863 | d4=.600 | |

-continued

| | $\beta=1.616$ | $f=-60.558$ | |
|---|---|---|---|
| $L_3$ | r5=−23.128 | d5=1.000 | n3=1.86994 ν3=39.8 |
| | r5′=116.966 | d5′=2.000 | n4=1.72825 ν4=28.3 |
| | r6=−35.739 | Bf′=36.538 | |
| Σd=8.03 | f1=18.923 | f2=−17.906 | f3=−58.319 | wherein,
 r is curvature radii of the respective lens surfaces;
 d is lens thickness on axis and air thickness;
 n is refractive index;
 ν is Abbe's number;
 affixed number is ordinal from the object side; and
 Bf′ is back focus after mounting the rear conversion lens;
 f1, f2 and f3 are focal lengths of the first, second and third lens components L1, L2 and L3 respectively;
 β is magnification and Σd is the distance from the apex of the front-most lens surface to the apex of the rear-most lens surface of the rear conversion lens.

13. A rear conversion lens according to claim 6 as represented by the following numerical data:

| | $\beta=1.617$ | $f=-58.338$ | |
|---|---|---|---|
| | | $d0=-27.384$ | |
| $L_1$ | r1=43.201 | d1=2.800 | n1=1.57501 ν1=41.6 |
| | r2=−13.670 | d2=.640 | |
| $L_2$ | r3=−13.936 | d3=1.000 | n2=1.86994 ν2=39.8 |
| | r4=−799.710 | d4=.650 | |
| $L_3$ | r5=−24.785 | d5=.900 | n3=1.84042 ν3=43.3 |
| | r5′=92.380 | d5′=2.100 | n4=1.69895 ν4=30.1 |
| | r6=−35.649 | Bf′=35.446 | |
| Σd=8.09 | f1=18.390 | f2=−16.313 | f3=−68.147 | wherein,
 r is curvature radii of the respective lens surfaces;
 d is lens thickness on axis and air thickness;
 n is refractive index;
 ν is Abbe's number;
 affixed number is ordinal from the object side; and
 Bf′ is back focus after mounting the rear conversion lens;
 f1, f2 and f3 are focal lengths of the first, second and third lens components L1, L2 and L3 respectively;
 β is magnification and Σd is the distance from the apex of the front-most lens surface to the apex of the rear-most lens surface of the rear conversion lens.

14. A rear conversion lens according to claim 7 as represented by the following numerical data:

| | $\beta=1.614$ | $f=-57.412$ | |
|---|---|---|---|
| | | $d0=-25.328$ | |
| $L_1$ | r1=77.231 | d1=2.900 | n1=1.54814 ν1=45.9 |
| | r2=−14.851 | d2=.600 | |
| $L_2$ | r3=−18.297 | d3=1.000 | n2=1.84042 ν2=43.3 |
| | r4=−106.425 | d4=1.100 | |
| $L_3$ | r5=−14.196 | d5=1.000 | n3=1.86994 ν3=39.8 |
| | r5′=.000 | d5′=2.300 | n4=1.71736 ν4=29.5 |
| | r6=−22.135 | Bf′=32.422 | |
| Σd=8.9 | f1=22.980 | f2=−26.428 | f3=−39.758 | wherein,
r is curvature radii of the respective lens surfaces;
d is lens thickness on axis and air thickness;
n is refractive index;
$\nu$ is Abbe's number;
affixed number is ordinal from the object side; and
Bf' is back focus after mounting the rear conversion lens;
f1, f2 and f3 are focal lengths of the first, second and third lens components L1, L2 and L3 respectively;
$\beta$ is magnification and $\Sigma$d is the distance from the apex of the front-most lens surface to the apex of the rear-most lens surface of the rear conversion lens.

15. A rear conversion lens according to claim 6 as represented by the following numerical data:

|  |  | $\beta$=1.634 | f=−70.459 |  |
|---|---|---|---|---|
|  |  | d0=−31.934 |  |  |
| L1 | r1=142.030 | d1=3.500 | n1=1.54814 | $\nu$1=45.9 |
|  | r2=−17.417 | d2=.750 |  |  |
| L2 | r3=−20.705 | d3=1.200 | n2=1.84042 | $\nu$2=43.3 |
|  | r4=−88.185 | d4=1.430 |  |  |
| L3 | r5=−18.340 | d5=1.000 | n3=1.84042 | $\nu$3=43.3 |
|  | r5'=.000 | d5'=2.600 | n4=1.68893 | $\nu$4=31.1 |
|  | r6=−29.039 | Bf'=41.785 |  |  |
| $\Sigma$d=10.48 | f1=28.526 | f2=−32.459 | f3=−50.413 |  | wherein,
r is curvature radii of the respective lens surfaces;
d is lens thickness on axis and air thickness;
n is refractive index;
$\nu$ is Abbe's number;
affixed number is ordinal from the object side; and
Bf' is back focus after mounting the rear conversion lens;
f1, f2 and f3 are focal lengths of the first, second and third lens components L1, L2 and L3 respectively;
$\beta$ is magnification and $\rho$d is the distance from the apex of the front-most lens surface to the apex of the rear-most lens surface of the rear conversion lens.

16. A rear conversion lens of negative refractive power for a compact camera to be mounted between an objective lens and an image plane of the compact camera to provide a composite focal length longer than the focal length of said objective lens, said objective lens having an exit angle in a range of from 25° to 40°, the exit angle being an angle which a light ray running from a position on an optical axis at an exit pupil of said objective lens toward a maximum image height forms with the optical axis, said rear conversion lens comprising, in the order from the object side:
 a first lens component having positive refractive power with its convex surface facing toward the image side;
 a second lens component having negative refractive power; and
 a third lens component having negative refractive power in the shape of a meniscus convex toward the image side;
wherein the conversion lens satisfies the conditions:

$$0.2 < r2/d0 < 0.8$$

$$0.1 < f2/f3 < 3.0$$

wherein,
r2 is curvature radius of the image-side lens surface of the first component;
−d0 is the distance from the rear focal point of said objective lens to the apex of the object side lens surface of said first lens component;
f2 is the focal length of said second lens component; and
f3 is the focal length of said third lens component.

17. A rear conversion lens according to claim 16, which further satisfies the condition:

$$0.2 < r2/r3 < 1.0$$

where r3 is curvature radius of the object side lens surface of the second lens component.

18. A rear conversion lens according to claim 17, wherein said second lens component includes a negative lens and a positive lens disposed at the image side of said negative lens.

19. A rear conversion lens according to claim 18, wherein said rear conversion lens satisfies the following conditions:

$$1.1 \times n1 < \frac{n2P + n2N}{2}$$

$$n2P < n2N$$

where n2P is refractive index of said positive lens in said second lens component and n2N is refractive index of said negative lens in said second lens component.

20. A rear conversion lens according to claim 19, wherein said rear conversion lens satisfies the following condition:

$$0.3 < r4/r6 < 7$$

where r4 is curvature radius of the image side lens surface of the positive lens in said second lens component and r6 is curvature radius of the image side lens surface of said third lens component.

21. A rear conversion lens according to claim 20, wherein said rear conversion lens further satisfies the following condition:

$$0.4 < \frac{|r3'|}{Y} < 40.0$$

where r3' is curvature radius of the image side lens surface of the negative lens in said second lens component and Y is the maximum image height on said image plane.

22. A rear conversion lens according to claim 21, wherein said negative lens and said positive lens in said second lens component are cemented to each other.

23. A rear conversion lens according to claim 21, wherein said negative lens and said positive lens in said second lens component are separated from each other.

24. A rear conversion lens according to claim 23 as represented by the following numerical data:

|  |  | $\beta$=1.889 | f=−42.458 |  |
|---|---|---|---|---|
|  |  | d0=−25.508 |  |  |
| L1 | r1=36.271 | d1=2.300 | n1=1.49108 | $\nu$1=57.57 |
|  | r2=−13.678 | d2=0.200 |  |  |

-continued

| | | $\beta=1.889$ | $f=-42.458$ | |
|---|---|---|---|---|
| L2 | r3=−19.230<br>r3'=22.552<br>r3''=24.687<br>r4=−38.361 | d3=0.900<br>d3'=0.300<br>d3''=2.2<br>d4=0.500 | n2=1.78797<br>n3=1.58518 | ν2=47.53<br>ν3=30.24 |
| L3 | r5=−12.782<br>r6=−34.040 | d5=0.900<br>Bf'=38.099 | n4=1.78797 | ν4=47.53 |

| Σd=7.3 | f1=20.537 | f2=−28.670 | f3=−26.47 |
|---|---|---|---| wherein,
r is curvature radii of the respective lens surfaces;
d is lens thickness on axis and air thickness;
n is refractive index;
ν is Abbe's number;
affixed number is ordinal from the object side; and
Bf' is back focus after mounting the rear conversion lens;
f1, f2 and f3 are focal lengths of the first, second and third lens components L1, L2 and L3 respectively;
β is magnification and Σd is the distance from the apex of the front-most lens surface to the apex of the rear-most lens surface of the rear conversion lens.

25. A rear conversion lens according to claim 22 as represented by the following numerical data:

| | | $\beta=1.889$ | $f=-42.674$ | |
|---|---|---|---|---|
| | | d0=−25.183 | | |
| L1 | r1=46.200<br>r2=−13.198 | d1=2.100<br>d2=0.300 | n1=1.46450 | ν1=65.79 |
| L2 | r3=−19.476<br>r3'=19.290<br>r4=−33.812 | d3=0.900<br>d3'=2.100<br>d4=0.500 | n2=1.84042<br>n3=1.69895 | ν2=43.30<br>ν3=30.09 |
| L3 | r5=−12.546<br>r6=−40.551 | d5=0.900<br>Bf'=38.368 | n4=1.74443 | ν4=49.53 |

| Σd=6.8 | f1=22.351 | f2=−35.413 | f3=−24.742 |
|---|---|---|---| wherein,
r is curvature radii of the respective lens surfaces;
d is lens thickness on axis and air thickness;
n is refractive index;
ν is Abbe's number;
affixed number is ordinal from the object side; and
Bf' is back focus after mounting the rear conversion lens;
f1, f2 and f3 are focal lengths of the first, second and third lens components L1, L2 and L3 respectively;
β is magnification and Σd is the distance from the apex of the front-most lens surface to the apex of the rear-most lens surface of the rear conversion lens.

26. A rear conversion lens according to claim 22 as represented by the following numerical data:

| | | $\beta=1.889$ | $f=-42.968$ | |
|---|---|---|---|---|
| | | d0=−25.412 | | |
| L1 | r1=63.666<br>r2=−13.542 | d1=2.300<br>d2=0.250 | n1=1.53172 | ν1=49.12 |
| L2 | r3=−19.878<br>r3'=21.741<br>r4=−39.429 | d3=0.900<br>d3'=2.200<br>d4=0.500 | n2=1.86994<br>n3=1.72825 | ν2=39.78<br>ν3=28.34 |
| L3 | r5=−12.366 | d5=0.900 | n4=1.84042 | ν4=43.30 |

| | | $\beta=1.889$ | $f=-42.968$ | |
|---|---|---|---|---|
| | r6=−31.580 | Bf'=38.524 | | |

| Σd=7.05 | f1=21.22 | f2=−32.923 | f3=−24.711 |
|---|---|---|---| wherein,
r is curvature radii of the respective lens surfaces;
d is lens thickness on axis and air thickness;
n is refractive index;
ν is Abbe's number;
affixed number is ordinal from the object side; and
Bf' is back focus after mounting the rear conversion lens;
f1, f2 and f3 are focal lengths of the first, second and third lens components L1, L2 and L3 respectively;
β is magnification and Σd is the distance from the apex of the front-most lens surface to the apex of the rear-most lens surface of the rear conversion lens.

27. A rear conversion lens according to claim 22 as represented by the following numerical data:

| | | $\beta=1.889$ | $f=-44.0$ | |
|---|---|---|---|---|
| | | d0=−26.321 | | |
| L1 | r1=38.362<br>r2=−13.257 | d1=2.100<br>d2=0.300 | n1=1.46450 | ν1=65.79 |
| L2 | r3=−20.081<br>r3'=11.998<br>r4=−51.157 | d3=0.900<br>d3'=2.100<br>d4=0.500 | n2=1.79668<br>n3=1.68893 | ν2=45.42<br>ν3=31.15 |
| L3 | r5=−12.113<br>r6=−30.820 | d5=0.900<br>Bf'=40.252 | n4=1.74400 | ν4=45.06 |

| Σd=6.8 | f1=21.5 | f2=−29.2 | f3=−27.4 |
|---|---|---|---| wherein,
r is curvature radii of the respective lens surfaces;
d is lens thickness on axis and air thickness;
n is refractive index;
ν is Abbe's number;
affixed number is ordinal from the object side; and
Bf' is back focus after mounting the rear conversion lens;
f1, f2 and f3 are focal lengths of the first, second and third lens components L1, L2 and L3 respectively;
β is magnification and Σd is the distance from the apex of the front-most lens surface to the apex of the rear-most lens surface of the rear conversion lens.

28. A rear conversion lens according to claim 22 as represented by the following numerical data:

| | | $\beta=1.889$ | $f=-42.372$ | |
|---|---|---|---|---|
| | | d0=−25.412 | | |
| L1 | r1=41.830<br>r2=−13.524 | d1=2.300<br>d2=0.250 | n1=1.49108 | ν1=57.57 |
| L2 | r3=−19.219<br>r3'=14.754<br>r4=−44.315 | d3=0.900<br>d3'=2.200<br>d4=0.500 | n2=1.78797<br>n3=1.64831 | ν2=47.53<br>ν3=33.77 |
| L3 | r5=−12.596<br>r6=−32.462 | d5=0.900<br>Bf'=38.260 | n4=1.78797 | ν4=47.53 |

| Σd=7.05 | f1=21.10 | f2=−28.785 | f3=−26.655 |
|---|---|---|---| wherein,
r is curvature radii of the respective lens surfaces;

d is lens thickness on axis and air thickness;
n is refractive index;
ν is Abbe's number;
affixed number is ordinal from the object side; and
Bf' is back focus after mounting the rear conversion lens;
f1, f2 and f3 are focal lengths of the first, second and third lens components L1, L2 and L3 respectively;
β is magnification and Σd is the distance from the apex of the front-most lens surface to the apex of the rear-most lens surface of the rear conversion lens.

29. A rear conversion lens according to claim 16, which further satisfies the condition:

$$|r_1/r_2| > 1.5$$

where $r_1$ is a radius of curvature of the object-side lens surface of the first component.

30. A rear conversion lens for a compact camera to be mounted between an objective lens and an image plane of the compact camera to provide a composite focal length longer than the focal length of said objective lens, said rear conversion lens comprising, in the order from the object side:
  a first lens component having positive refractive power with its convex surface facing toward the image side;
  a second lens component having negative refractive power and including a negative lens and a positive lens disposed at the image side of said negative lens; and
  a third lens component having negative refractive power in the shape of a meniscus convex toward the image side;
wherein the conversion lens satisfies the conditions:

$$0.2 < r_2/d0 < 0.8$$

$$1.1 \times n1 < \frac{n2P + n2N}{2}$$

wherein,
  r2 is curvature radius of the image-side lens surface of the first component;
  −d0 is the distance from the rear focal point of said objective lens to the apex of the object side lens surface of said first lens component;
  n1 is refractive index of said first lens component;
  n2P is refractive index of said positive lens in said second lens component; and
  n2N is refractive index of said negative lens in said second lens component.

31. A rear conversion lens according to claim 30, wherein said rear conversion lens satisfies the following condition:

$$n2P < n2N.$$

* * * * *